(12) United States Patent
Maejima et al.

(10) Patent No.: US 7,724,474 B2
(45) Date of Patent: May 25, 2010

(54) THIN-FILM MAGNETIC HEAD COMPRISING CONTACT PAD INCLUDING PORTIONS OF CLOSURE AND SUBSTRATE AND MAGNETIC RECORDING APPARATUS COMPRISING THE HEAD

(75) Inventors: Kazuhiko Maejima, Chuo-ku (JP);
 Mitsuyoshi Kawai, Chuo-ku (JP);
 Hiroki Matsukuma, Chuo-ku (JP);
 Katsumichi Tagami, Chuo-ku (JP);
 Makoto Yoshida, Chuo-ku (JP); Hiroshi Kamiyama, Chuo-ku (JP)

(73) Assignee: TDK Corporation, Tokyo (JP)

( * ) Notice: Subject to any disclaimer, the term of this patent is extended or adjusted under 35 U.S.C. 154(b) by 928 days.

(21) Appl. No.: 11/497,376

(22) Filed: Aug. 2, 2006

(65) Prior Publication Data
 US 2007/0035877 A1 Feb. 15, 2007

(30) Foreign Application Priority Data
 Aug. 9, 2005 (JP) ............................. 2005-230496
 Sep. 7, 2005 (JP) ............................. 2005-258872

(51) Int. Cl.
 *G11B 5/60* (2006.01)
(52) U.S. Cl. ............... 360/237.1; 360/234.7; 360/235.7; 360/236.3; 360/236.5; 360/237
(58) Field of Classification Search ... 360/234.7–234.8, 360/236.3, 236.5, 235.7, 237–237.1
 See application file for complete search history.

(56) References Cited

U.S. PATENT DOCUMENTS

| | | | |
|---|---|---|---|
| 5,142,768 A | | 9/1992 | Aboaf et al. |
| 5,296,993 A | | 3/1994 | Aboaf et al. |
| 5,822,153 A | * | 10/1998 | Lairson et al. ............ 360/234.7 |
| 6,025,974 A | * | 2/2000 | Tokuyama et al. ....... 360/234.7 |

(Continued)

FOREIGN PATENT DOCUMENTS

JP 61-042715 A 3/1986

(Continued)

OTHER PUBLICATIONS

Japanese Patent Office Action dated Jun. 3, 2008.

(Continued)

*Primary Examiner*—A. J. Heinz
(74) *Attorney, Agent, or Firm*—Frommer Lawrence & Haug LLP

(57) ABSTRACT

A thin-film magnetic head that shows stable read and/or write performances, maintaining the reliability over time by suppressing the wear of the head sufficiently, is provided. The head comprises: a substrate having an element-formed surface and an opposed-to-medium surface; a magnetic head element; an overcoat layer formed on the element-formed surface so as to cover the magnetic head element; a closure provided on the overcoat layer, a surface of the closure being in contact with the upper surface of the overcoat layer; and an element contact pad formed in a sliding-side surface of the head and having a contact surface including a part of the opposed-to-medium surface, a part of an end surface of the overcoat layer and a part of an end surface of the closure, one end of the magnetic head element reaching the contact surface.

42 Claims, 14 Drawing Sheets

U.S. PATENT DOCUMENTS

| | | |
|---|---|---|
| 6,198,600 B1 * | 3/2001 | Kitao et al. ............... 360/235.2 |
| 6,865,059 B2 * | 3/2005 | Sasaki et al. ............. 360/246.2 |
| 6,947,259 B2 | 9/2005 | Miyazaki et al. |
| 2002/0008944 A1 * | 1/2002 | Honma et al. ................ 360/313 |

FOREIGN PATENT DOCUMENTS

| | | |
|---|---|---|
| JP | 02-058760 A | 2/1990 |
| JP | 03-088171 A | 4/1991 |
| JP | 06-012622 | 1/1994 |
| JP | 06-309625 | 11/1994 |
| JP | 08-321012 | 12/1996 |
| JP | 10-154315 A | 6/1998 |
| JP | 2001-076413 A | 3/2001 |

OTHER PUBLICATIONS

U.S. Appl. No. 11/553,706, filed Oct. 27, 2006.

* cited by examiner

TRAILING SIDE ←——→ LEADING SIDE

DIRECTION ALONG TRACK

TRAILING SIDE ←——————→ LEADING SIDE

THIN-FILM MAGNETIC HEAD COMPRISING CONTACT PAD INCLUDING PORTIONS OF CLOSURE AND SUBSTRATE AND MAGNETIC RECORDING APPARATUS COMPRISING THE HEAD

PRIORITY CLAIM

This application claims priorities from Japanese patent application No. 2005-230496, filed on Aug. 9, 2005 and Japanese patent application No. 2005-258872, filed on Sep. 7, 2005, which are incorporated herein by reference.

BACKGROUND OF THE INVENTION

1. Field of the Invention

The present invention relates to a thin-film magnetic head that comprises a closure and makes contact with a magnetic recording medium, a head gimbal assembly (HGA) with the thin-film magnetic head and a magnetic recording apparatus with the HGA and the medium.

2. Description of the Related Art

A magnetic disk drive apparatus such as a hard disk drive (HDD) or a flexible disk drive (FDD) is a representative example of the magnetic recording apparatuses, which is portable and lower in price per byte than semiconductor memory. Recently, because the volume of various data becomes larger due to the spread use of the multimedia and the Internet, the magnetic disk drive apparatus is strongly required to have much larger capacity and to be further miniaturized.

In the situation, a contact-type apparatus is worth noting because of its possibility of higher recording density, which, for example, has a loading mechanism for transferring an inserted cartridge including a disk to the predetermined position, a rotary drive mechanism for holding and rotating the disk in the transferred cartridge, a magnetic head device for writing data signals to the rotated disk and reading data signals from it, and a moving mechanism for moving the magnetic head device in the radial direction on the disk.

The magnetic head in the magnetic head device writes and reads data signals in contact with the magnetic disk. A Metal-In-Gap (MIG) head has conventionally used as the contact-type head. However, in order to respond the increasing data storage capacity and the further miniaturization of the magnetic disk drive apparatus, a thin-film magnetic head for an HDD, which inherently meets higher recording density, is being applied to the contact-type apparatus. The thin-film magnetic head for the HDD has a structure suitable for flying on the magnetic disk without contact during read and write operations. Therefore, the simple use of the thin-film magnetic head under the contact condition may cause a significant wear or crash of the head. To avoid the problem, U.S. Pat. No. 6,947,259 proposes the limitation to a predetermined range of the distance between an electromagnetic transducer (magnetic head element) and the contact edge of an overcoat layer. Further, Japanese Patent Publication No. 06-309625A describes a contact-type head for perpendicular magnetic recording with the sliding surface of an antiwear layer.

Furthermore, U.S. Pat. No. 5,142,768 and Japanese Patent Publications Nos. 08-321012A and 06-012622A describe a magnetic head used for a magnetic tape drive etc., which has a bonded protection plate such as a closure block.

However, in the head described in U.S. Pat. No. 6,947,259, the sliding surface of the protective film is still worn largely, and especially when an alumina thick film is used as the protective film, the degree of wear becomes larger than that of the slider substrate. Further, the formation of the thick film with thickness of 50 to 200 micrometers requires significant man-hours. A contact-type head described in Japanese Patent Publication No. 06-309625A has the same kind of problem.

Further, when the "closure-type" magnetic head described in U.S. Pat. No. 5,142,768 and Japanese Patent Publications Nos. 08-321012A and 06-012622A is used for a magnetic disk drive apparatus such as a FDD, the contact edge of the whole magnetic head is rather separated from the contact end of the head element during read and write operations. Therefore, the area of the magnetic disk such as the flexible disk opposed to the end of the head element is bent, then the bending is likely to cause the distance between the end of the head element and the disk surface to be fluctuated. As a result, read and write performances may become unstable.

BRIEF SUMMARY OF THE INVENTION

Therefore, it is an object of the present invention to provide a thin-film magnetic head that shows stable read and/or write performances, maintaining the reliability over time by suppressing the wear of the head sufficiently, an HGA provided with this thin-film magnetic head and a magnetic recording apparatus provided with this HGA.

Here, some terms will be defined before explaining the present invention. In a layered structure of the head elements formed on an element-formed surface of a substrate, a component that is closer to the substrate than a standard layer is defined to be "below" or "lower" in relation to the standard layer, and a component that is in the stacked direction side of the standard layer is defined to be "above" or "upper" in relation to the standard layer.

According to the present invention, a thin-film magnetic head is provided, which comprises: a substrate having an element-formed surface and an opposed-to-medium surface; at least one magnetic head element provided on/above the element-formed surface, for writing and/or reading data signals; an overcoat layer formed on the element-formed surface so as to cover the at least one magnetic head element; a closure provided on the overcoat layer, a surface of the closure being in contact with the upper surface of the overcoat layer; and at least one element contact pad formed in a sliding-side surface of the thin-film magnetic head and having a contact surface including a part of the opposed-to-medium surface of the substrate, a part of an end surface of the overcoat layer and a part of an end surface of the closure, one end of the at least one magnetic head element reaching the contact surface.

In this head, it is preferable that at least one of the at least one element contact pad is provided on a central axis of the sliding-side surface expanding in the direction along track. It is also preferable that at least one of the at least one element contact pad is provided in a position that is out of a central axis of the sliding-side surface expanding in the direction along track and is not overlapped with the central axis.

By providing the above-described element contact pad, only the contact surface of the element contact pad can have contact with the surface of the magnetic recording medium in the peripheral area of the magnetic head element during read and write operations. As a result, the wear of the head is sufficiently suppressed and the high reliability over time of the head can be maintained.

Furthermore, in the case where the magnetic recording medium is pinched by the two thin-film magnetic heads or by the thin-film magnetic head and the dummy head, the bending of the magnetic recording medium is adjusted to be a predetermined shape. As a result, one end of the magnetic head element and the surface of the magnetic recording medium have a secure contact with each other, therefore, the head can realize stable read and write performances.

Further, in the head according to the present invention, it is preferable that a distance $L_P$ from the one end of the magnetic head element to the trailing end of a contact region of the contact surface satisfies a conditional expression of $22 \leq L_P \leq 100$, a unit of said distance $L_P$ being micrometer (μm). Here, in the case that the element contact pad and a magnetic recording medium are in contact with the whole part of the contact surface ranging on the trailing side in relation to the one end of the magnetic head element, the distance $L_P$ is a distance between the trailing end of the contact surface and the one end of the magnetic head element.

When the distance $L_P$ is 22 μm or more, a secure and favorable wear resistance can be obtained as explained later in detail. And when the distance $L_P$ is 100 μm or less, a predetermined reproduction power can be maintained also as explained later in detail.

Furthermore, in the head according to the present invention, at least one contact pad is preferably provided in the opposed-to-medium surface of the substrate. The contact pad causes the degree of the contact between the head and the medium to be decreased, therefore, the wear of the head becomes more suppressed. In the case, it is also preferable that the one element contact pad and the two contact pads are provided in the sliding-side surface of the thin-film magnetic head.

Further, in the head according to the present invention, the closure preferably has a flat or curved cut-surface bordering a sliding-side end surface of the closure at its trailing edge. It is also preferable that the closure has at least one flat or curved cut-surface cutting obliquely across a trailing edge of a sliding-side end surface of the closure.

Further, in the head according to the present invention, the at least one magnetic head element comprises a electromagnetic coil element for writing data signals and a magnetoresistive (MR) effect element for reading data signals. In the case, it is more preferable that the MR effect element is a tunnel magnetoresistive (TMR) effect element.

Further, in the head according to the present invention, preferably, at least one signal electrode used for the at least one magnetic head element is provided on an exposed part of the upper surface of the overcoat layer.

According to the present invention, an HGA (head gimbal assembly) is further provided, which comprises: the above-described thin-film magnetic head, trace conductors for supplying currents to the at least one magnetic head element, and a support structure for supporting the thin-film magnetic head.

According to the present invention, a magnetic recording apparatus is further provided, which comprises; at least one HGA described-above, at least one magnetic recording medium, and a recording and/or reproducing circuit for controlling write and/or read operations of the at least one thin-film magnetic head in relation with the at least one magnetic recording medium.

In the magnetic recording apparatus, it is preferable that the respective sliding-side surfaces of the two thin-film magnetic heads pinch the magnetic recording medium and the respective element contact pads of the two thin-film magnetic heads are positioned not to be opposed to each other. In the case, more preferably, each of the two thin-film magnetic heads has the one element contact pad, and the one element contact pad is provided in a position to be out of respective central axes expanding in the direction along track of the sliding-side surfaces of the two thin-film magnetic heads, in opposite direction to each other, and the one element contact pad is not overlapped with the central axis.

In the just-described embodiment, only the contact surface of the element contact pad can have contact with the surface of the magnetic recording medium in the peripheral area of the magnetic head element during read and write operations. As a result, the wear of the head is sufficiently suppressed and the high reliability over time of the head can be maintained. Furthermore, because the bending of the magnetic recording medium is adjusted to be a predetermined shape, one end of the magnetic head element and the surface of the magnetic recording medium have a secure contact with each other, therefore, the head can realize stable read and write performances.

Furthermore, it is more preferable that a spacing $D_P$ in the track width direction between the respective two element contact pads of the two thin-film magnetic heads and a distance $S_P$ between the respective contact surfaces of the two element contact pads satisfy a condition expression of $0.02 \leq S_P/D_P \leq 0.2$.

When the ratio $S_P/D_P$ satisfies $0.02 \leq S_P/D_P \leq 0.2$, the contact condition between the element contact pads and the surface of the magnetic recording medium can be stabilized as explained later in detail. As a result, a predetermined reproduction power can be maintained.

Further, it is also preferable that respective sliding-side surfaces of the thin-film magnetic head and a dummy head pinch the magnetic recording medium, and the dummy head has at least one concave portion provided in a position that is in the sliding-side surface and is opposed to the at least one element contact pad, the at least one concave portion being so large in size that at least a part of the element contact pad can be inserted. In the case, it is more preferable that the thin-film magnetic head has the one element contact pad, and the one element contact pad is provided on a central axis of the sliding-side surface of the thin-film magnetic head expanding in the direction along track.

In the just-described embodiment, only the contact surface of the element contact pad can have contact with the surface of the magnetic recording medium in the peripheral area of the magnetic head element during read and write operations. As a result, the wear of the head is sufficiently suppressed and the high reliability over time of the head can be maintained. Furthermore, because the bending of the magnetic recording medium is adjusted to be a predetermined shape, one end of the magnetic head element and the surface of the magnetic recording medium have a secure contact with each other, therefore, the head can realize stable read and write performances.

Furthermore, it is more preferable that a width $W_P$ in the track width direction of the one element contact pad, a width $W_C$ in the track width direction of the concave portion, and a distance $S_C$ between the contact surface of the one element contact pad and a sliding-side surface of the dummy head satisfy a condition expression of $0.012 \leq S_C/(0.5*(W_C-W_P)) \leq 0.1$.

When the ratio $S_C/(0.5*(W_C-W_P))$ satisfies $0.012 \leq S_P/D_P \leq 0.1$, the contact condition between the element contact pads and the surface of the magnetic recording medium can be stabilized as explained later in detail. As a result, a predetermined reproduction power can be maintained.

Further objects and advantages of the present invention will be apparent from the following description of preferred embodiments of the invention as illustrated in the accompanying drawings. Some elements have been designated with same reference numerals in the different drawings.

DETAILED DESCRIPTION OF THE INVENTION

Figure 1:
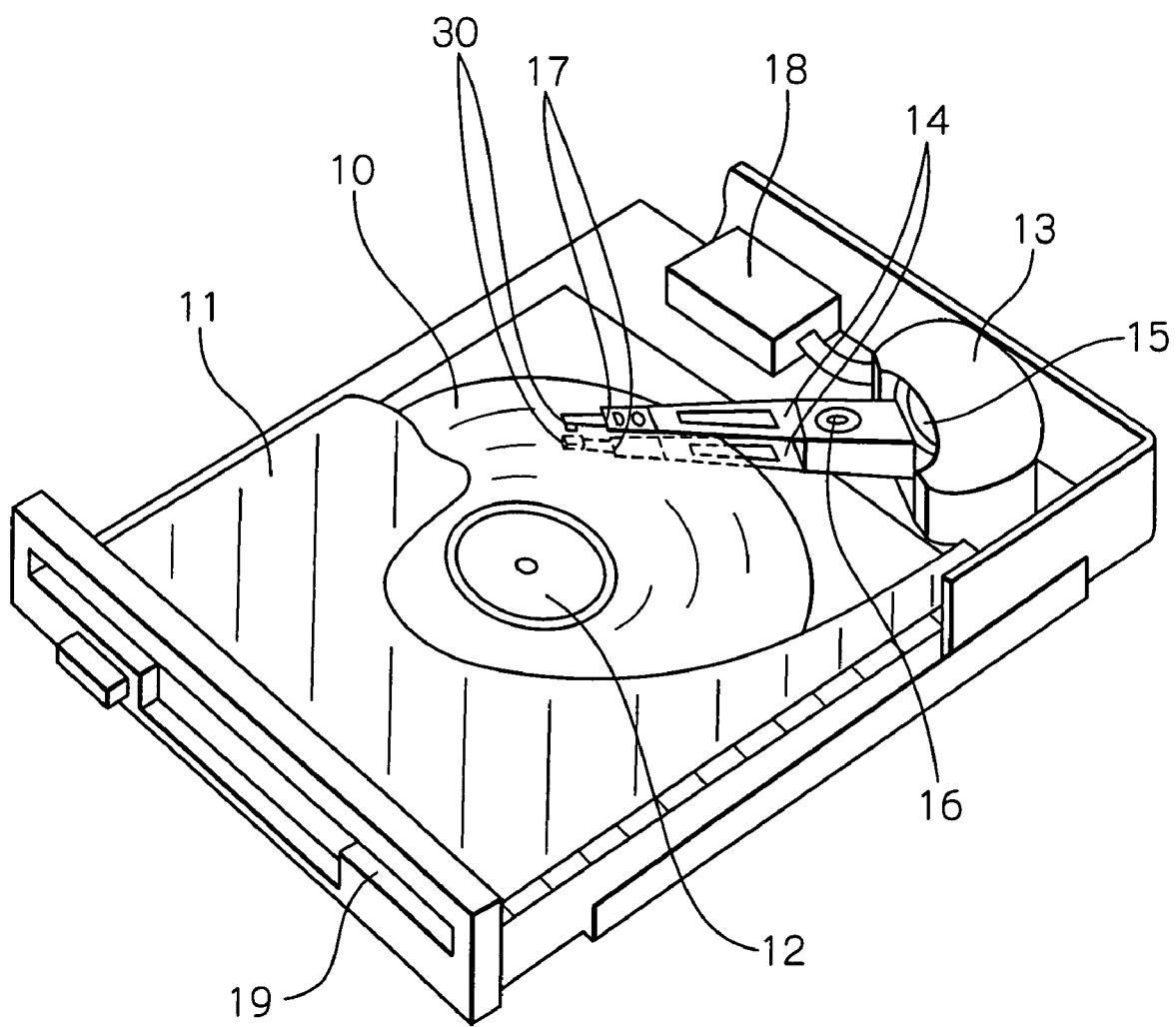
FIG. 1 shows a perspective view schematically illustrating a structure of a main part of an embodiment of a magnetic recording apparatus according to the present invention.

FIG. 1 shows a perspective view schematically illustrating a structure of a main part of an embodiment of a magnetic recording apparatus according to the present invention.

In FIG. 1, reference numeral 10 indicates a magnetic disk that is included in a disk cartridge 11 and has a centered hub 12 to be coupled with a spindle motor. The magnetic disk 10 may be flexible or rigid, and is formed by stacking magnetic recording layer(s) on one/both side(s) of a disk substrate made of a polymer film, a thin metal foil, a thick nonmagnetic metal such as Al or Al alloys, or a glass.

Also in the figure, Reference numeral 13 indicates an assembly carriage device for positioning two thin-film magnetic heads 30 on both tracks on front and rear sides of the disk respectively, 18 indicates a recording and reproducing circuit for controlling write and read operations of the thin-film magnetic heads 30, and 19 indicates a loading slot to which the disk cartridge 11 is inserted, respectively. The disk cartridge 11 has a window and a shutter, though not shown in the figure. When the disk cartridge 11 is loaded through the loading slot 19, the shutter is opened and the surface of the magnetic disk 10 is exposed, then the thin-film magnetic heads 30 writes to the disk 10 and reads from the disk 10.

The assembly carriage device 13 is provided with two drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A thin-film magnetic head 30 is mounted on each HGA 17 so that the magnetic disk 10 is pinched by the two magnetic heads. A part of the sliding-side surface of each thin-film magnetic head 30 is in contact with the front/rear surface of the magnetic disk 10 during read and write operations. As described later, one of the thin-film magnetic heads 30 may be a dummy head for stabilizing the contact between the other head and the surface of the disk 10.

In the above-described embodiment, the magnetic disk 10 is included in the disk cartridge 11, however, it is also preferable that the center of the magnetic disk is connected to the axis of the spindle motor, and the disk is full-time fixed in the apparatus. Further, in this disk-fixed case, a plurality of the magnetic disks can be stacked in the direction along the axis of the spindle motor accompanied by double or appropriate number of the HGAs and drive arms.

Figure 2:
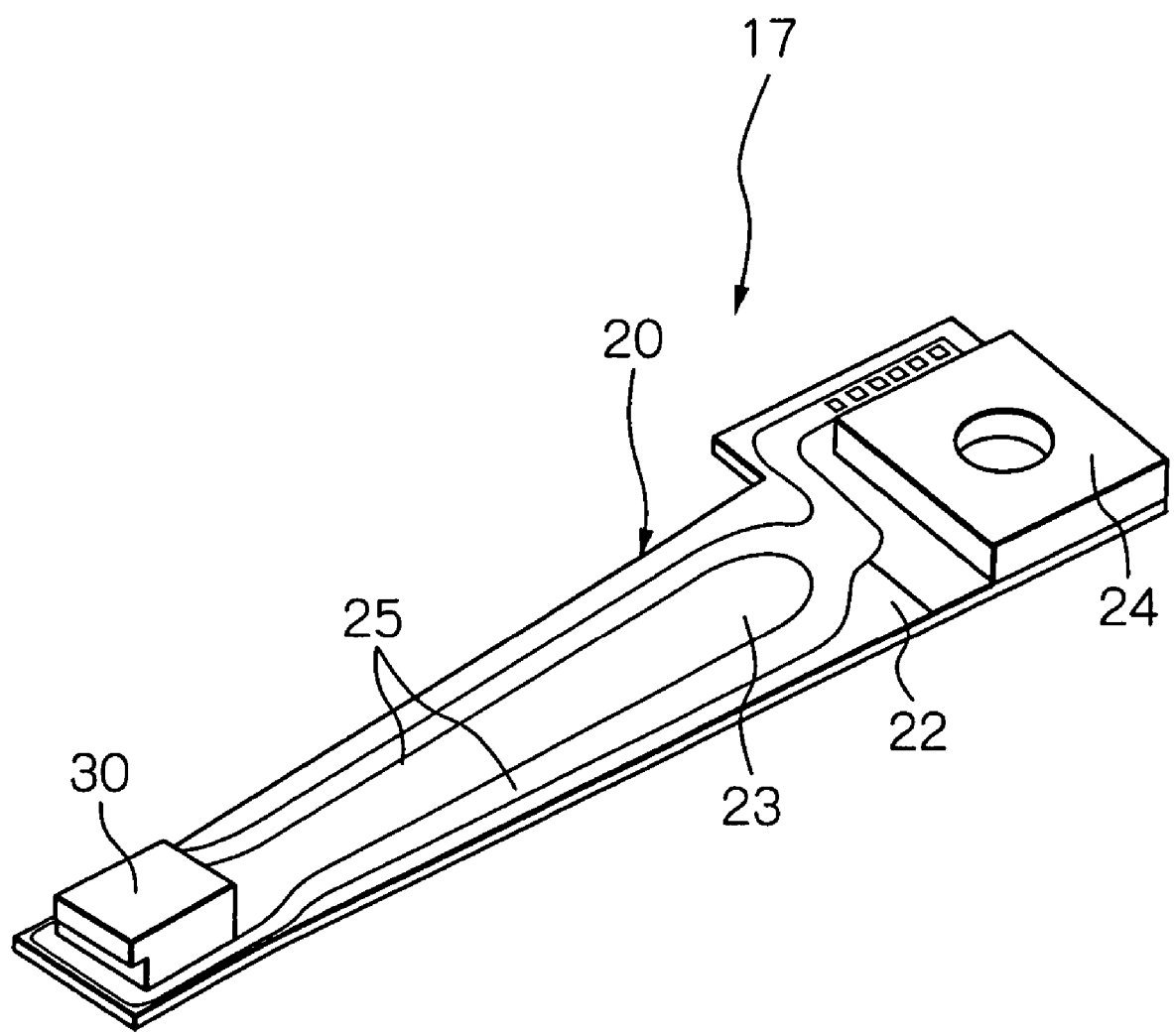
FIG. 2 shows a perspective view illustrating an embodiment of an HGA according to the present invention.

FIG. 2 shows a perspective view illustrating an embodiment of an HGA according to the present invention.

As shown in FIG. 2, the HGA 17 is constructed by fixing the thin-film magnetic head 30 on an end portion of a suspension 20 and by electrically connecting one end of a wiring member 25 to signal electrodes of the head 30. The suspension 20 is mainly constructed of a load beam 22, a flexure 23 with elasticity fixed and supported on this load beam 22, a base plate 24 provided on the base portion of the load beam 22, and the wiring member 25 that is made up of trace conductors and connection pads electrically connected to both ends of the trace conductors, provided on the flexure 23. Though not shown in the figure, it is also possible to attach a head drive IC chip at some midpoint of the suspension 20.

Figure 3:
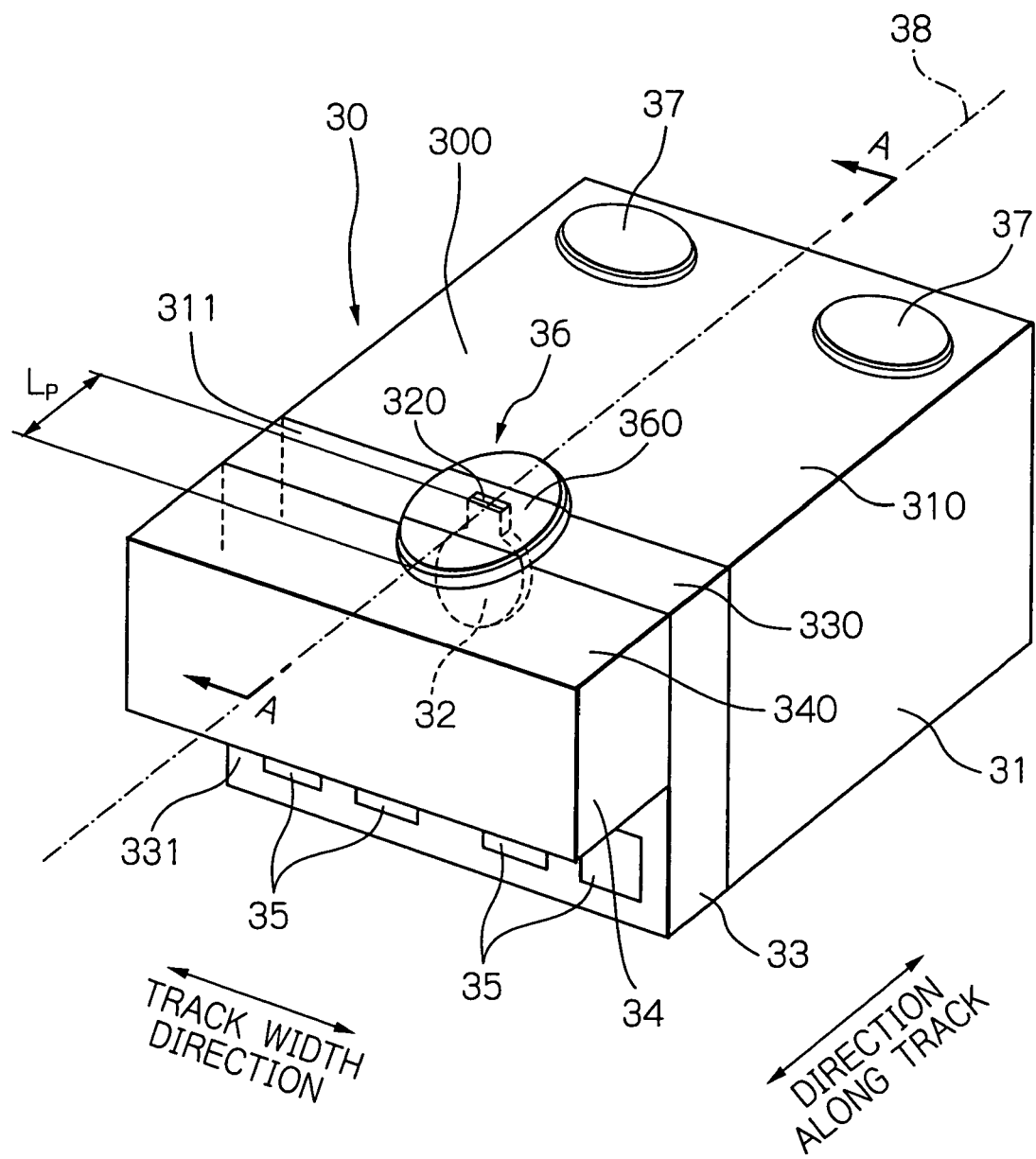
FIG. 3 shows a perspective view schematically illustrating an embodiment of a thin-film magnetic head provided on the end portion of the HGA.

FIG. 3 shows a perspective view schematically illustrating an embodiment of a thin-film magnetic head provided on the end portion of the HGA.

As shown in the figure, the thin-film magnetic head 30 is provided with a slider substrate 31 having a opposed-to-disk surface (opposed-to-medium surface) 310 and an element-formed surface 311 perpendicular to the surface 310, a magnetic head element 32 formed on/above the element-formed surface 311, an overcoat layer 33 formed on the element-formed surface 311 so as to cover the magnetic head element 32, a closure 34 bonded on a part of the upper surface 330 of the overcoat layer 33, an element contact pad 36 formed in the sliding-side surface 300 of the head 30 where one end 320 of the magnetic head element 32 reaches the contact surface 360 of the pad 36, two contact pads 37 formed in the opposed-to-disk surface 310, and four signal electrodes 35 used for the magnetic head element 32, formed on an exposed part of the upper surface 331 of the overcoat layer 33.

The element contact pad 36 has the contact surface 360 with an elliptical shape having a major axis along track, and is provided on the central axis 38 of sliding-side surface 300 expanding in the direction along track. That is to say, the element contact pad 36 is centrally positioned in track width direction. The contact surface 360 consists of a part of the opposed-to-disk surface 310 of the slider substrate 31, a part of the end surface 330 of the overcoat layer 33, and a part of the end surface 340 of the closure 34. One end 320 of the magnetic head element 32 reaches the above-described part of the end surface 330 of the overcoat layer 33. In this embodiment, the contact surfaces of the contact pads 37 also have an elliptical shape.

By providing the above-described element contact pad 36, only the contact surface 360 can have contact with the surface of the magnetic disk in the peripheral area of the magnetic head element during read and write operations. As a result, the wear of the head is sufficiently suppressed and the high reliability over time of the head can be maintained. Further, peripheral corners of the element contact pad 36 and the contact pads 37 are chamfered to be made round. The chamfered corners are preventive against damage on the surface of the magnetic disk by contact.

Further, a distance $L_P$ (μm (micrometer)) between the trailing end of the contact surface 360 and the one end 320 of the magnetic head element 32 is preferably set to a value satisfying the conditional expression of 22 (μm)$\leq L_P \leq$100 (μm). The appropriate $L_P$ value allows a lopsided wear of the element contact pad 36 to be suppressed sufficiently, and furthermore, the reproduction power of the magnetic head element 32 remains a required level. Here, the starting point on the magnetic head element side in the definition of the distance $L_P$ is a trailing edge in the surface of the one end 320 of the magnetic head element 32, which is exposed from the contact surface 360. The above-described conditional expression of the distance $L_P$ will be explained later in detail.

The four signal electrodes 35 are formed on an exposed part of the upper surface 331 of the overcoat layer 33. In the conventional manufacturing process of a thin-film magnetic head with a closure on the overcoat layer, it is difficult to set up a surface for forming the signal electrodes. However, by forming the signal electrodes on the exposed part of the upper surface of the overcoat layer 33, the reliable signal electrodes can be provided without great burden in manufacturing process.

As is obvious, the thin-film magnetic head according to the present invention is not limited to the above-described embodiment. For example, the contact surface of the element contact pad 36 as well as the contact pads 37 may have a shape of ellipsoid with the major axis along track width direction, circle or rectangle. Further, the number of the signal electrodes 35 may be optional though depending on the structure and number of the magnetic head element 32 or the other elements, and the presence of grounding to the slider substrate 31. Some alternatives of the element contact pad will be described later in detail.

FIG. 4 shows a cross-sectional view taken along line A-A illustrating a main part of the magnetic head element 32 in FIG. 3. In the figure, the magnetic head element 32 and the signal electrode 35 appear on the same cross-section in convenience. However, for example, the signal electrodes 35 may be provided in the positions where they do not appear in this cross-section.

As shown in the figure, the magnetic head element 32 comprises an MR effect element 321 for reading data signals and an electromagnetic coil element 322 for writing data signals. Two and two of the four signal electrodes 35 (only one appears in the figure) are connected to the MR effect element 321 and the electromagnetic coil element 322 respectively.

The one ends of the MR effect element 321 and the electromagnetic coil element 322 reaches the contact surface 360 of the element contact pad 36. In the thin-film magnetic head 30, the contact surface 360 has contact with the rotated magnetic disk during read and write operations, then the MR effect element 321 reads by receiving signal fields form the disk and the electromagnetic coil element 321 writes by applying signal fields to the disk.

The MR effect element 321 includes an MR multilayer 321b, and a lower shield layer 321a and an upper shield layer 321c disposed in positions sandwiching the MR multilayer 321b. The lower shield layer 321a and the upper shield layer 321c prevent the MR multilayer 321b from receiving external magnetic fields as disturbing noises. The lower shield layer 321a and the upper shield layer 321c are formed of, for example, NiFe, CoFeNi, CoFe, FeN, FeZrN or the multilayer of these materials with thickness of approximately 0.5 μm to 3 μm by means of, for example, frame plating technique, respectively.

The MR multilayer 321b is preferably a TMR multilayer that is a magnetic field sensitive part utilizing a TMR effect. The TMR multilayer has a main multilayered structure in which a free layer and a pinned layer sandwich a tunnel barrier layer. In this structure, when the direction of the magnetization in the free layer varies according to signal fields, the tunnel current increase or decease due to the fluctuation in the state density of up-spin and down-spin electrons, therefore, the electrical resistance of the TMR multilayer is changed. The measurement of change in the resistance allows weak signal fields to be read.

Generally, a temperature coefficient of the resistance-change ratio has a minus value, and the absolute value is at least one order of magnitude smaller than that of the other MR effect. Therefore, using the TMR multilayer can suppress the generation of abnormal signals (thermal asperity) due to the frictional heat between the MR effect element and the surface of the disk. When the generated thermal asperity is tolerable, the MR multilayer 321b may be a CIP (current in plain)—GMR (giant magnetoresistive) multilayer or a CPP (current perpendicular to plain)—GMR multilayer, each of which can also senses signal fields with very high sensitivity.

The electromagnetic coil element 322 comprises: a lower magnetic pole layer 322a formed of, for example, NiFe, CoFeNi, CoFe, FeN, FeZrN or the multilayer of these materials with thickness of approximately 0.5 μm to 3 μm by means of, for example, frame plating technique; a write gap layer 322b formed of, for example, $Al_2O_3$, $SiO_2$, AlN or DLC (diamond-like carbon) with thickness of approximately 0.01 μm to 0.05 μm by means of sputtering or chemical vapor deposition (CVD) method; a coil layer 322c formed of, for example, Cu with thickness of approximately 1 μm to 5 μm by means of, for example, frame plating; a coil insulating layer 322d formed of, for example, a heat-cured resist so as to cover the coil layer 322c with thickness of approximately 0.5 μm to 7 μm; and an upper magnetic pole layer 322e formed of, for example, NiFe, CoFeNi, CoFe, FeN, FeZrN or the multilayer of these materials with thickness of approximately 0.5 μm to 3 μm by means of, for example, frame plating technique.

The upper and lower magnetic pole layers 322e and 322a constitute a magnetic path for magnetic flux generated by the coil layer 322c, their one end portions pinching one end portion of the write gap layer 322b. The leakage field near the one end portion of the write gap layer 322b is used for writing to the magnetic disk.

In FIG. 4, the coil layer 322c is a monolayered coil, however, may be an at-least-two-layered coil or a helical coil. Further, instead of the upper shield layer 321c and the lower magnetic pole layer 322a, only one magnetic layer may be formed which serves as both layers.

Here, the above-described starting point on the magnetic head element side in the definition of the distance $L_P$ becomes the trailing edge of the pole end of the upper magnetic pole layer 322e, which is exposed from the contact surface 360.

Figure 4A:
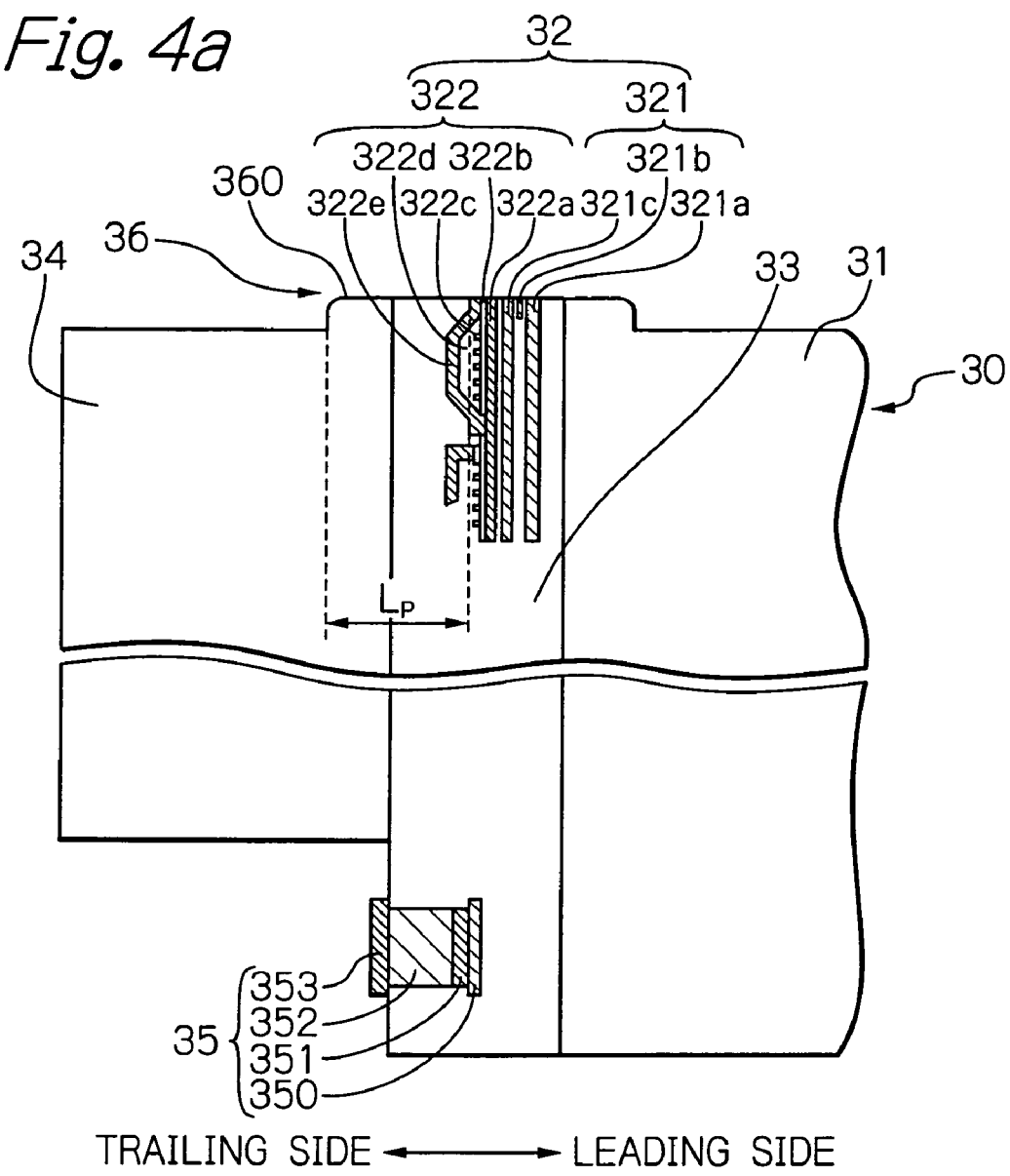
FIG. 4 shows a cross-sectional view taken along line A-A illustrating a main part of the magnetic head element in FIG. 3.
Figure 4B:
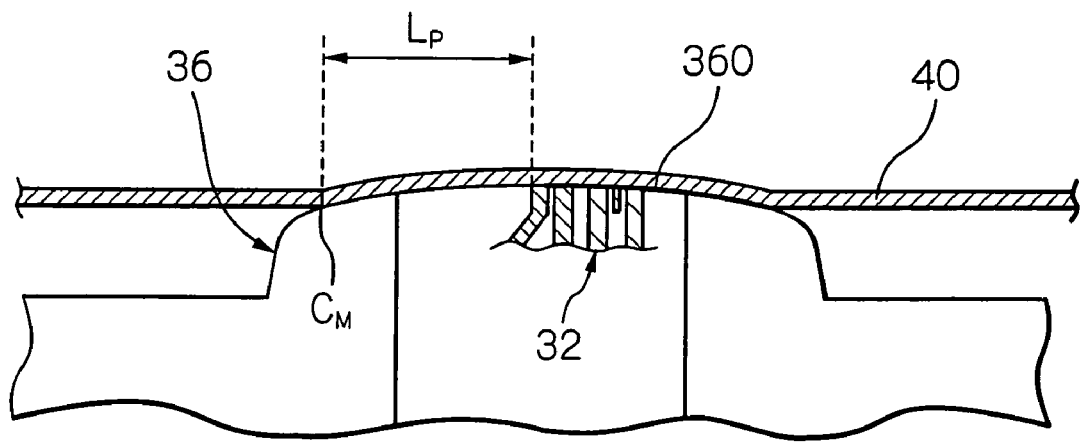

Further, when the element contact pad 36 has a crown (rounded shape in the contact surface 360) as shown in FIG. 4b, the distance $L_P$ is defined as a distance from the just-described starting point to the contact end $C_M$ between the surface of the magnetic disk 40 and the rounded contact surface 360. That is to say, the distance $L_P$ corresponds to the distance from the one end of the magnetic head element to the trailing end of the actual contact region between the element contact pad and the disk. Therefore, the definition of the distance $L_P$ shown in FIG. 4a is premised on the contact between the chamfered corner of the contact surface 360 and the disk surface. If not the case, the end point in the definition of the $L_P$ becomes the actual contact end.

The signal electrode 35 is formed on a lead electrode 350, and is connected electrically to the lead electrode 350. The lead electrode 350 is connected electrically to the MR multilayer 321b of the MR effect element 321 or the coil layer 322c of the electromagnetic coil element 322, and is drawn from the element. A base electrode film 351 with conductivity is formed on the lead electrode 350, and a bump 352 that is extending upward are formed by electrolytic plating using the base electrode film 351 as electrode. The base electrode film 351 and the bump 352 are made of a conductive material such as Cu. The thickness of the base electrode film 351 is, for example, approximately 10 nm to 200 nm and the thickness of the bump 352 is, for example, approximately 5 μm to 30 μm.

The top end of the bump 352 is exposed from the overcoat layer 33, and a pad 353 is provided on this top end. These above-described parts constitute the signal electrode 35, and currents are supplied to the magnetic head element 32 through the four signal electrodes 35.

Figure 5:
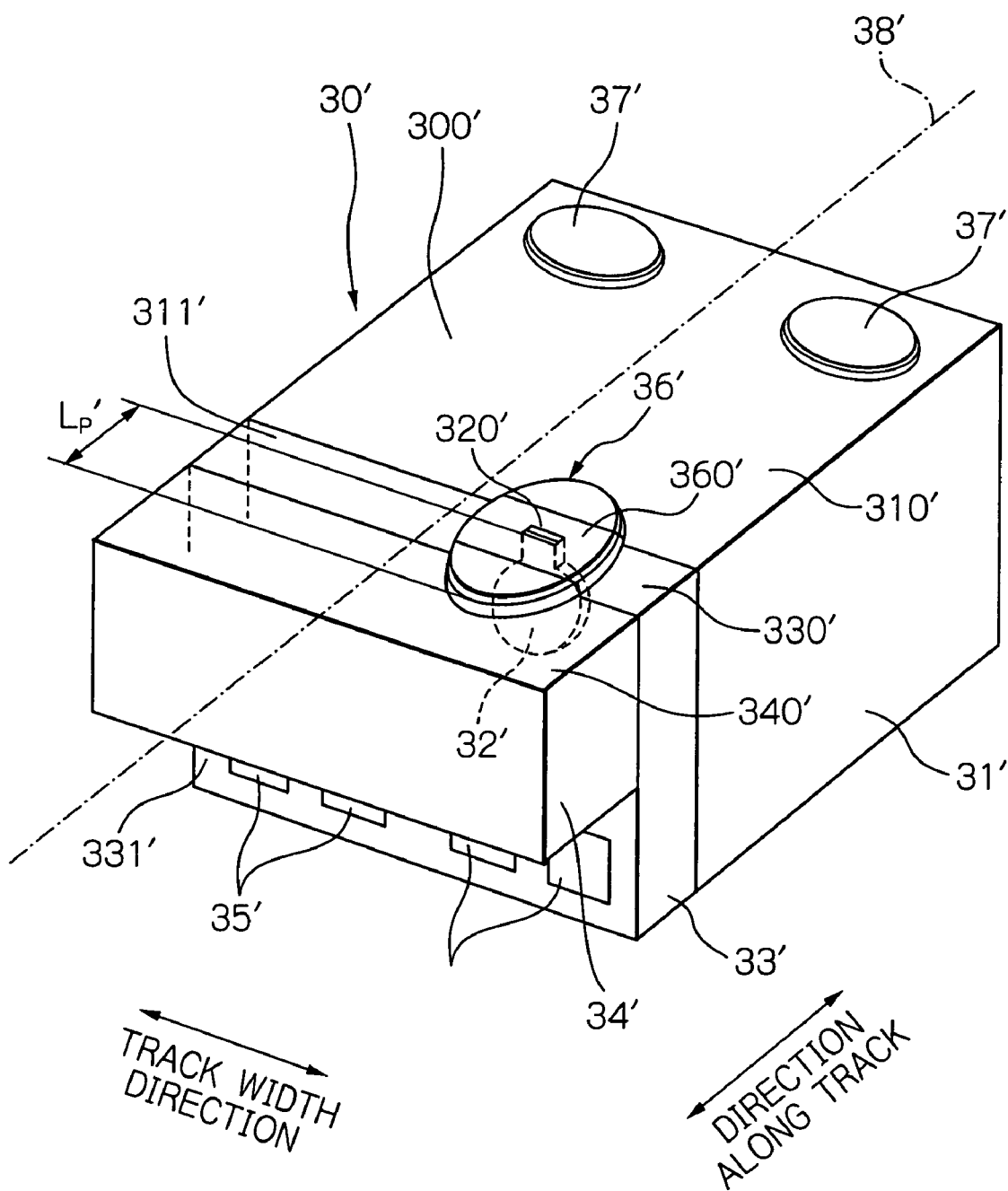
FIG. 5 shows a perspective view schematically illustrating another embodiment of a thin-film magnetic head according to the present invention.

FIG. 5 shows a perspective view schematically illustrating another embodiment of a thin-film magnetic head according to the present invention.

As shown in the figure, the thin-film magnetic head 30' is provided with a slider substrate 31', a magnetic head element 32', an overcoat layer 33', a closure 34', an element contact pad 36', two contact pads 37', and four signal electrodes 35'. Explanations for elements other than the element contact pad 36' will be omitted because the structures and positions of these elements are the same as those shown in FIG. 3.

The element contact pad 36' is provided in a position that is out of a central axis 38' of a sliding-side surface 300' expanding in the direction along track and is not overlapped with the central axis 38'. That is to say, the element contact pad 36' is off-centered in track width direction, and is positioned near one head edge expanding in the direction along track. The contact surface 360' consists of a part of an opposed-to-disk surface 310' of the slider substrate 31', a part of an end surface 330' of the overcoat layer 33', and a part of an end surface 340' of the closure 34'. One end 320' of the magnetic head element 32' reaches the above-described part of the end surface 330' of the overcoat layer 33'.

By providing the above-described element contact pad 36', only the contact surface 360' can have contact with the surface of the magnetic disk in the peripheral area of the magnetic head element during read and write operations. As a result, the wear of the head is sufficiently suppressed and the high reliability over time of the head can be maintained. Further, peripheral corners of the element contact pad 36' and the contact pads 37' are chamfered to be made round. The chamfered corners are preventive against damage on the surface of the magnetic disk by contact.

Further, a distance $L_P'$ (μm (micrometer)) between the trailing end of the contact surface 360' and the one end 320' of the magnetic head element 32' is preferably set to a value satisfying the conditional expression of 22 (μm)$\leq L_P' \leq$100 (μm). The appropriate $L_P'$ value allows a lopsided wear of the element contact pad 36' to be suppressed sufficiently, and furthermore, the reproduction power of the magnetic head element 32' remains a required level. Here, the starting point on the magnetic head element side in the definition of the distance $L_P'$ is a trailing edge in the surface of the one end 320' of the magnetic head element 32', which is exposed from the contact surface 360'. When the element contact pad 36' has a crown (rounded shape-in the contact surface 360'), the definition of the distance $L_P'$ becomes the same as the content explained using FIG. 4b. Further, The above-described conditional expression of the distance $L_P'$ will be explained as an expression of the distance $L_P$ later in detail.

When two thin-film magnetic heads 30' pinch the magnetic disk, the respective element contact pads 36' are positioned to be out of the respective central axes 38' in opposite direction to each other, and not to be opposed to each other.

Figure 6A:
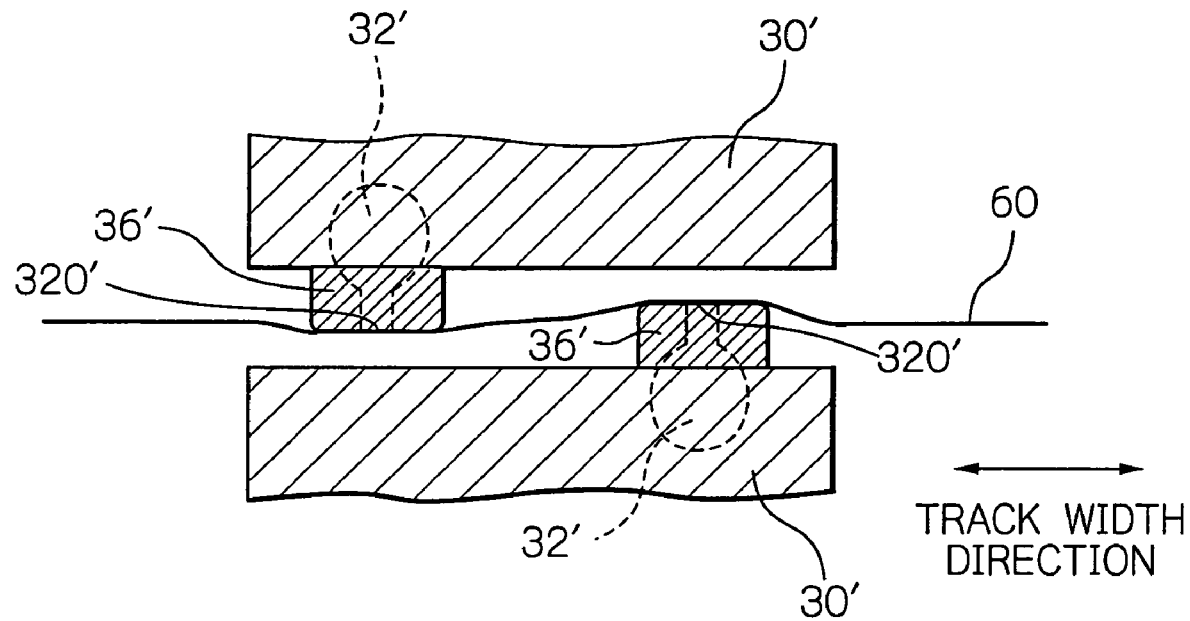
FIGS. 6a and 6b show cross-sectional views illustrating two embodiments of the condition of contact between the thin-film magnetic head and the magnetic disk in a magnetic recording apparatus according to the present invention.
Figure 6B:
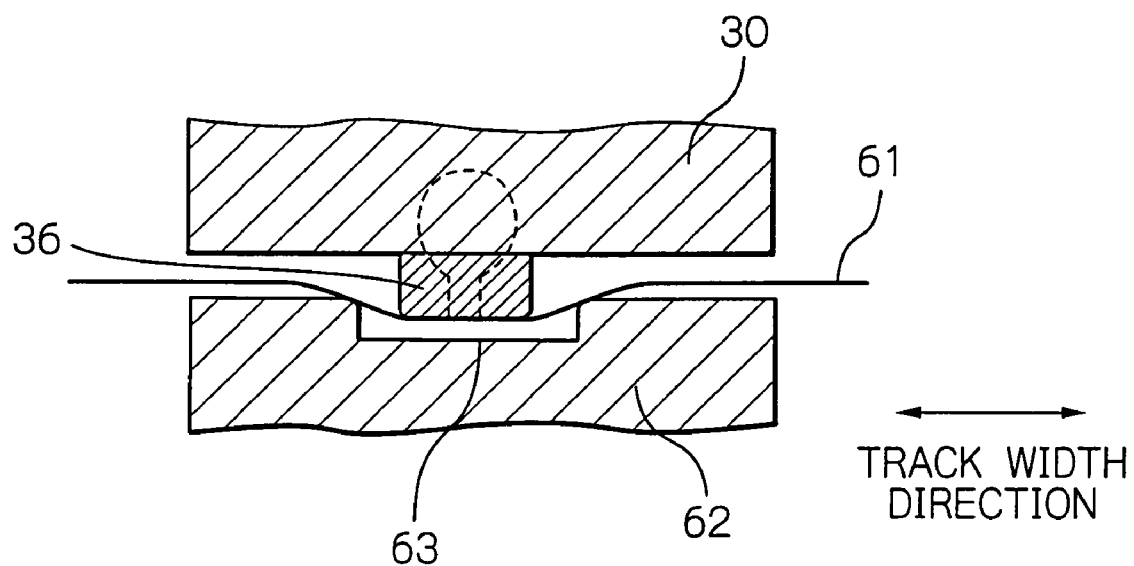

FIGS. 6a and 6b show cross-sectional views illustrating two embodiments in condition of the contact between the thin-film magnetic head and the magnetic disk in a magnetic recording apparatus according to the present invention.

According to FIG. 6a, a magnetic disk 60 is pinched by the two thin-film magnetic heads 30', as just described above. In the case, especially when the disk is flexible, the element contact pads 36' support the magnetic disk in such a way that that a vertical section of the disk becomes a gradual S-curve shape. As a result, one end 320' of the magnetic head element 32' reaching the contact surface of the pad 36' and the surface of the disk 60 have a secure contact with each other.

According to FIG. 6b, a magnetic disk 61 is pinched by the thin-film magnetic head 30 and a dummy head 62 formed of the same material as the slider substrate. The dummy head 62 has a concave portion 63 in the sliding-side surface. The concave portion 63 is provided in a position opposed to the element contact pad 36 of the head 30, and is so large in size that a part of the element contact pad 36 can be inserted. As a result, the element contact pad 36 and the concave portion 63 support the magnetic disk so as to make a gradual dent on the disk, especially when the disk is flexible. Therefore, one end 320 of the magnetic head element 32 reaching the contact surface of the pad 36 and the surface of the disk 61 have a secure contact with each other. Further, the opening edge of the concave portion 63 is chamfered to be made round. The chamfered edge is preventive against damage on the surface of the magnetic disk by contact.

Embodiments or alternatives other than the two embodiments shown in FIG. 6a and 6b can be allowed. For example, in FIG. 6a, one thin-film magnetic head 30' may have a plurality of element contact pads 36', and the other head 30' may have the element contact pad(s) 36' in the position not to opposed to any of the plurality of element contact pads 36'. Further, one or some of the element contact pads 36' may be a dummy that has no magnetic head elements and is just for adjusting the bending of the magnetic disk.

Further, in FIG. 6b, the element contact pad 36 and the concave portion 63 may be provided in the position out of the middle, that is, not to be central in the track-width direction. Furthermore, in FIG. 6b, a plurality of the element contact pads 36 may be provided and the same number of the concave portions 63 may be positioned so as to be opposed to the plurality of the element contact pads 36 respectively.

In any embodiment and alternative described above, only the contact surface of the element contact pad can have contact with the surface of the magnetic disk in the peripheral area of the magnetic head element during read and write operations. As a result, the wear of the head is sufficiently suppressed and the high reliability over time of the head can be maintained. Furthermore, by adjusting the bending of the magnetic disk, one end of the magnetic head element and the surface of the magnetic disk can have a secure contact with each other. Therefore, the head can realize stable read and write performances.

In each configuration of FIGS. 6a and 6b, an appreciate adjustment of the positional relation between the element contact pads or between the element contact pad and the dummy head allows the element contact pad(s) and the magnetic disk to have a secure and favorable contact with each other. As a result, the reproduction power remains a required level. The relation between the positional relation and the reproduction power will be described later in detail.

Figure 7A:
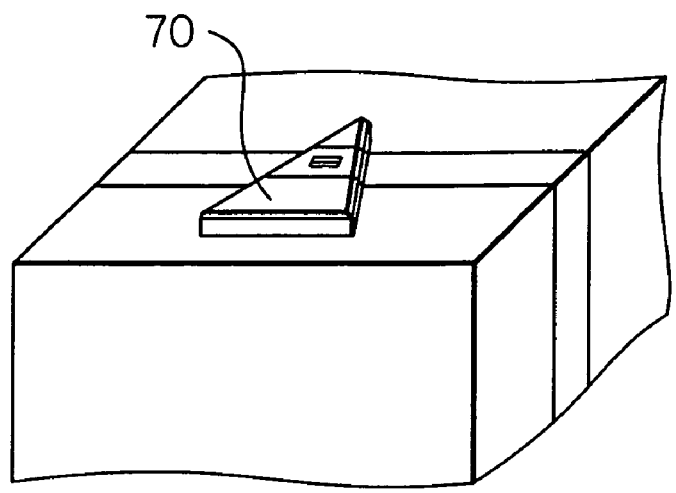
FIGS. 7a and 7b show perspective views schematically illustrating alternatives in shape of the element contact pad of the thin-film magnetic head according to the present invention.
Figure 7B:
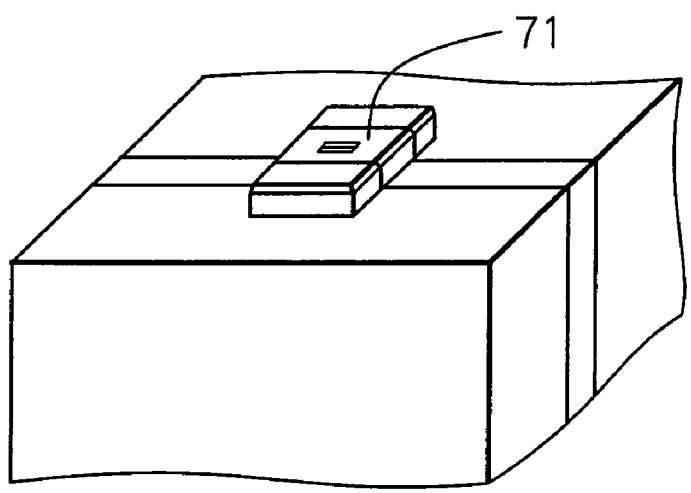
Figure 7C:
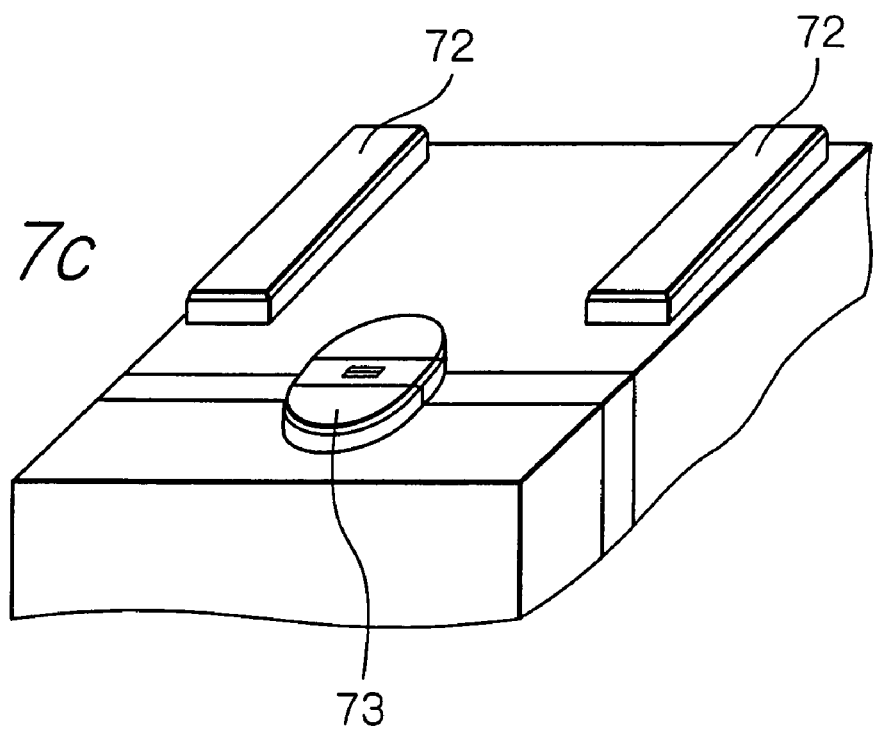
FIG. 7c shows a perspective view schematically illustrating an alternative of the contact pads of the thin-film magnetic head according to the present invention.

FIGS. 7a and 7b show perspective views schematically illustrating alternatives in shape of the element contact pad of the thin-film magnetic head according to the present invention, and FIG. 7c shows a perspective view schematically illustrating an alternative of the contact pads of the thin-film magnetic head according to the present invention.

As shown in FIG. 7a, a contact surface of an element contact pad 70 has a triangular shape, and as shown in FIG. 7b, a contact surface of an element contact pad 71 has a rectangular shape. The shape of the contact surface may also be a circle, a trapezoid or a polygon. In any above-described shape including an ellipsoid shown in FIG. 3, only the contact surface of the element contact pad can have contact with the surface of the magnetic disk in the peripheral area of the magnetic head element during read and write operations. As a result, the wear of the head is sufficiently suppressed and the high reliability over time of the head can be maintained.

According to FIG. 7c, two contact pads 72 have a shape of two rails expanding in the direction along track. In this alternative, an element contact pad 73 has a shape of ellipsoid, however, it may have a shape of, for example, circle, triangle, rectangle, trapezoid or polygon.

Further, as shown in FIG. 7a to 7c, peripheral corners of the element contact pad and the contact pads with rail shape are chamfered to be made round. The chamfered corners are preventive against damage on the surface of the magnetic disk by contact.

FIGS. 8a to 8d and FIGS. 9a to 9d show perspective views and cross-sectional views illustrating alternatives in shape of the closure of the thin-film magnetic head according to the present invention.

Figure 8A:
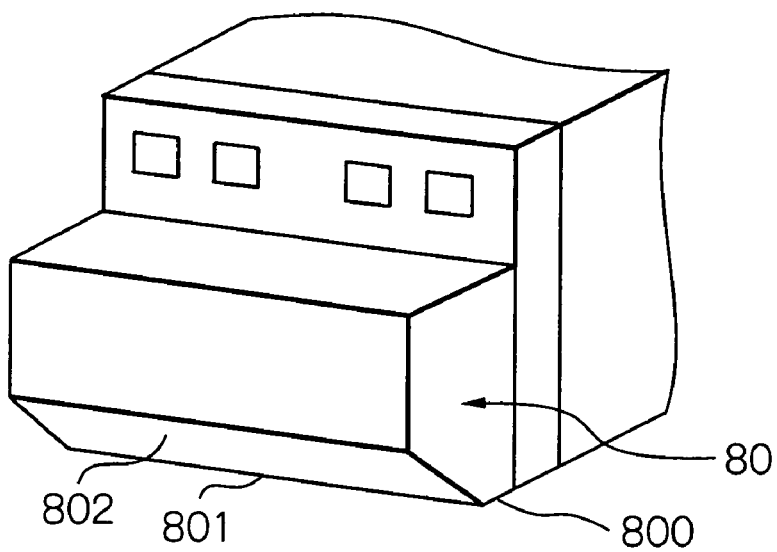
FIGS. 8a to 8d show perspective views and cross-sectional views illustrating alternatives in shape of the closure of the thin-film magnetic head according to the present invention.
Figure 8B:
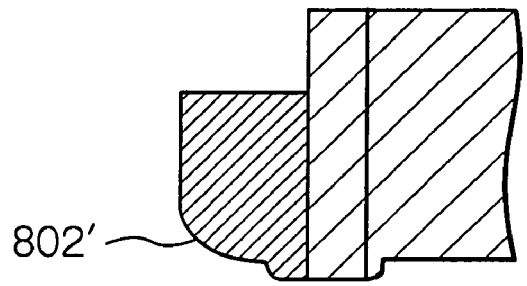
Figure 8C:
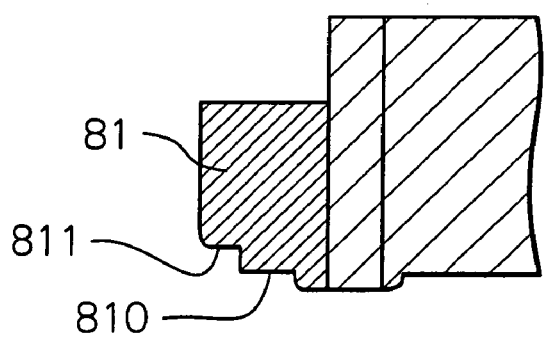

According to FIG. 8a, a closure 80 has a cut-surface 802 bordering a sliding-side end surface 800 of the closure 80 at a trailing edge 801. The cut-surface 802 is flat, however, may be curved like a cut-surface 802' shown in FIG. 8b. Further, a step 811 may be formed in a sliding-side end surface 810 of a closure 81.

Figure 8D:
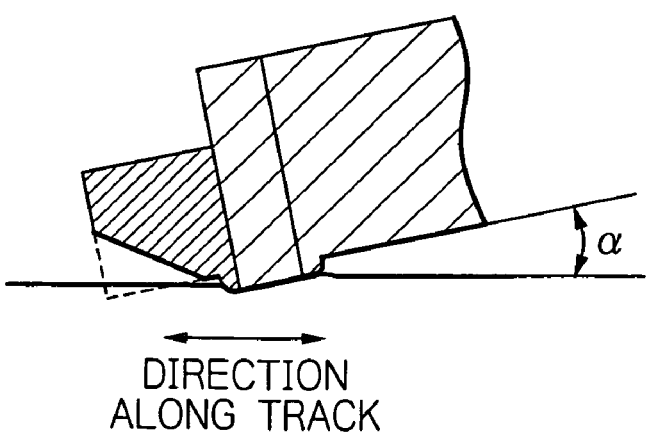

In the thin-film magnetic head with the above-described closure, the element contact pad can be provided so as to have contact with the disk surface before the closure has, even when a pitch angle α (alpha) becomes large, as shown in FIG. 8d. As a result, the end of the magnetic head element and the surface of the magnetic disk can be in contact with each other more stably.

Figure 9A:
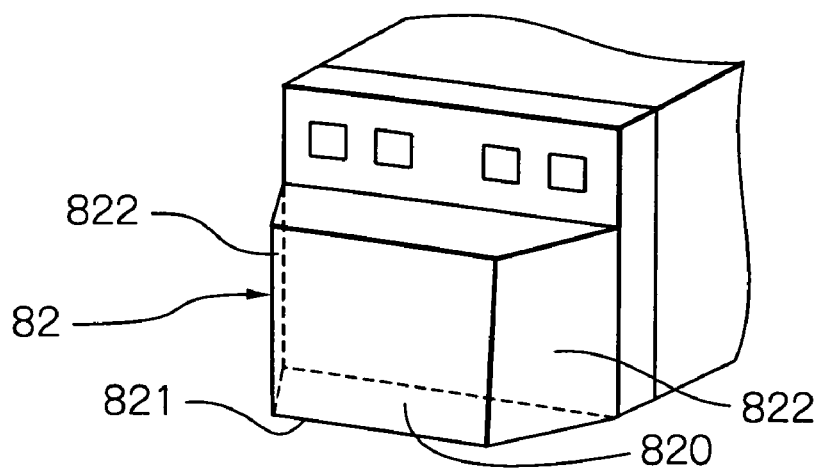
FIGS. 9a to 9d show perspective views and cross-sectional views illustrating alternatives in shape of the closure of the thin-film magnetic head according to the present invention.
Figure 9B:
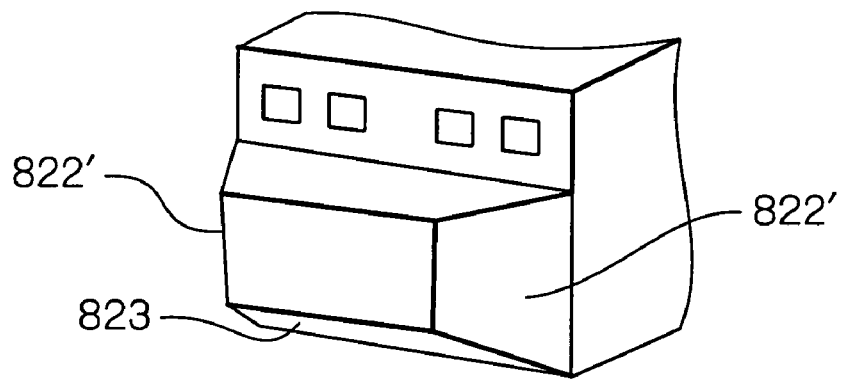
Figure 9C:
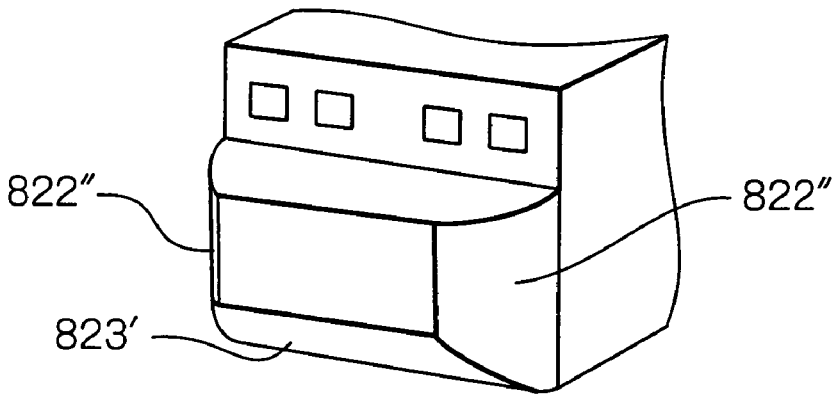

As shown in FIG. 9a, a closure 82 has cut-surfaces 822 cutting obliquely across a trailing edge 821 of a sliding-side end surface 820 of the closure 82. The cut-surfaces 822 are flat, however, may be curved. Further, as shown in FIG. 9b, cut-surfaces 822' may be provided together with a cut-surface 823. Furthermore, all of cut-surfaces 822'' and 823' may be curved as shown in FIG. 9c.

Figure 9D:
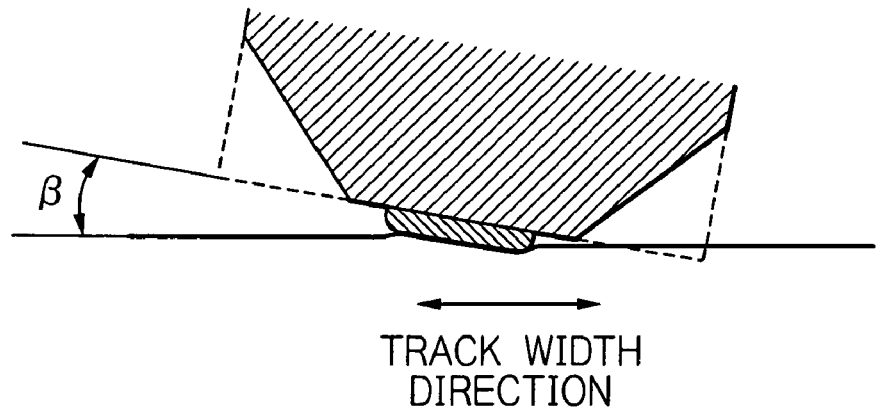

In the thin-film magnetic head with the above-described closure, the element contact pad can be provided so as to have contact with the disk surface before the closure has, even when a roll angle β (beta) becomes large, as shown in FIG. 9d. As a result, the end of the magnetic head element and the surface of the magnetic disk can be in contact with each other more stably.

FIGS. 10a to 10d show perspective views schematically illustrating a part of an embodiment of a manufacturing method of a thin-film magnetic head according to the present invention.

Figure 10A:
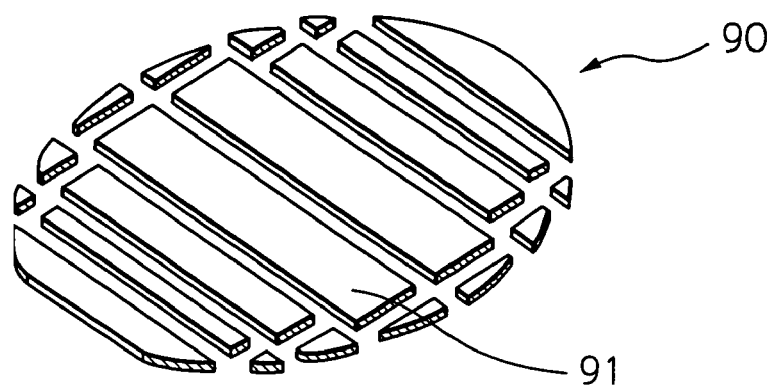
FIGS. 10a to 10d show perspective views schematically illustrating a part of an embodiment of a manufacturing method of the head according to the present invention.
Figure 10B:
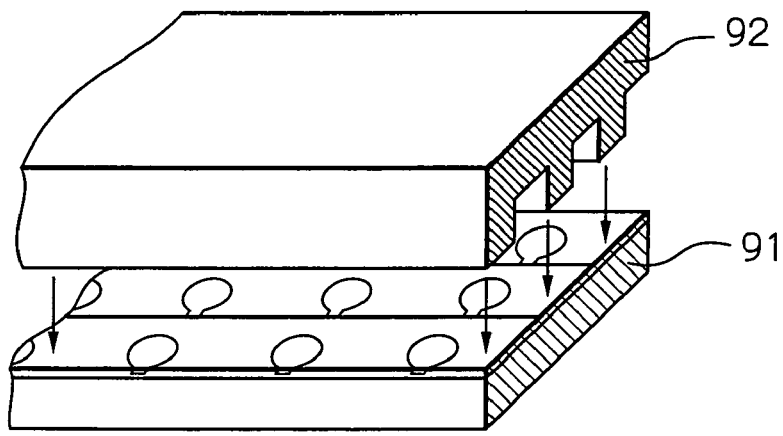
Figure 10C:
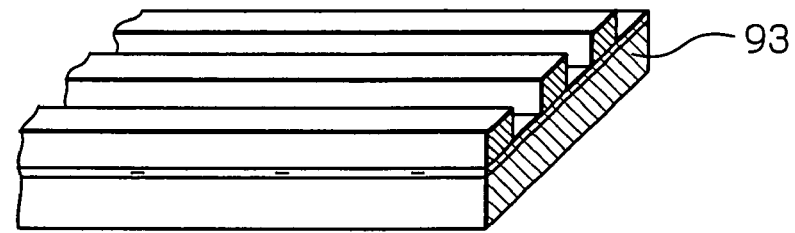

First, as shown in FIG. 10a, a wafer 90 where magnetic head elements are formed on a wafer substrate of alumina-titanium oxide ($Al_2O_3$—TiC) by means of the well-known manufacturing method, is cut into blocks 91 on each of which a plurality of the magnetic head elements is aligned with some rows. Next, as shown in FIG. 10b, a closure member 92 made of alumina-titanium oxide is bonded on the element-formed surface of the block 91. The closure member 92 has a surface for bonding with a plurality of long convex-portions aligned, and is bonded on surface area including ranges above the magnetic head elements, expect surface area including signal electrodes and their peripheries. Then, as shown in FIG. 10c, a block 93 with closure is formed by polishing the piece made of the block 91 and the closure member 92 from the side of the closure member 92.

Figure 10D:
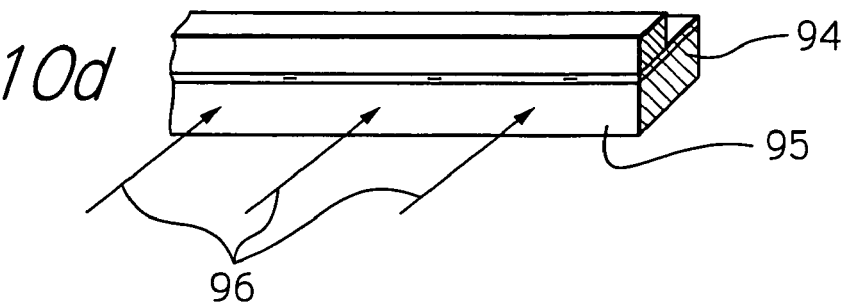

Next, as shown in FIG. 10d, the block 93 with closure is cut into bars 94, then, the MR height process is performed by polishing the bar 94 to obtain a desired MR height. Further, a predetermined element contact pad and contact pads are formed by the bombardment of ions 96 using ion-milling or reactive ion etching method to complete the process of a sliding-side surface 95. Then, the bar 94 is cut to separate into individual sliders (thin-film magnetic heads). After going through the above-described processes, the manufacturing process of the thin-film magnetic head is finished.

Hereinafter, the preferable conditions to be satisfied by the distance $L_P$ between the trailing end of the contact surface and the one end of the magnetic head element, from the standpoints of the amount of wear and the reproduction power in the head, will be explained in detail.

Figure 11A:
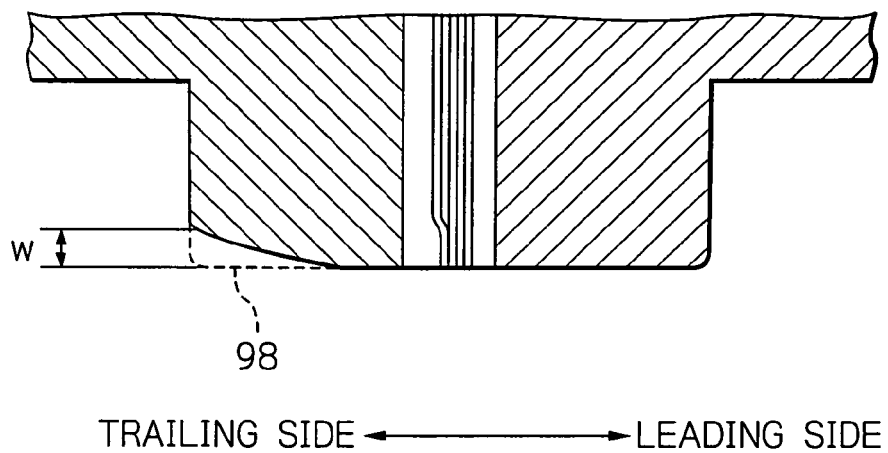
FIGS. 11a shows a schematic view for defining the amount of lopsided wear w of the element contact pad.
Figure 11B:
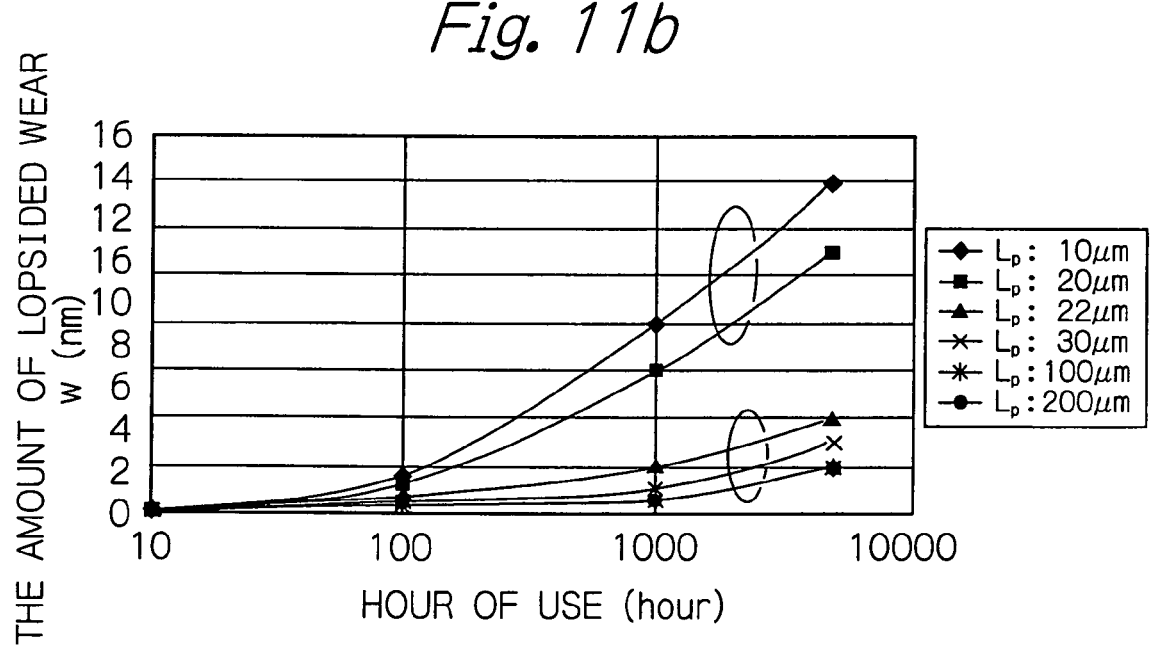
FIG. 11b shows a graph illustrating the relation between the hour of use and the amount of lopsided wear w.

FIG. 11a shows a schematic view for defining the amount of lopsided wear w of the element contact pad, and FIG. 11b shows a graph illustrating the relation between the hour of use and the amount of lopsided wear w in the thin-film magnetic heads with various distances $L_P$. Thin-film magnetic heads shown in FIG. 3 having a pico slider or a femto slider in which the distance $L_P$ is 10, 20, 22, 30, 100 or 200 μm, were prepared for the measurements. Then, a flexible disk made by applying a magnetic material on a flexible film substrate was rotated with the same rotating speed as that during write and read operations. After that, the thin-film magnetic heads were in contact with the rotating disk under the same pressure as that during write and read operations.

The pico slider has a normalized size of a length 1.20 mm, a width 1.00 mm and a height 0.3 mm (with a tolerance of plus or minus 0.03), and the femto slider has a normalized size of a length 0.85 mm, a width 0.70 mm and a height 0.23 mm (with a tolerance of plus or minus 0.03). The used flexible disk had a thickness in the range from 40 μm to 80 μm including a major value of 55 μm. The Young's modulus of the disk was actually in the range from 2.9 GPa (300 kgf/mm$^2$) to 8.8 GPa (900 kgf/mm$^2$). Preferably, the Young's modulus may be in the range from 4.9 GPa (500 kgf/mm$^2$) to 7.8 GPa (800 kgf/mm$^2$). The surface roughness Ra of the disk was in the range from 2.0 nm to 3.0 nm.

According to FIG. 11a, a part of the trailing side in the element contact pad is worn away, and the amount of lopsided wear w is defined as a distance between the contact surface 98 and the trailing end of the wear part.

As shown in FIG. 11b, the amount of lopsided wear w is increased with the hour of use in any of the heads with various distances $L_P$. By comparison of the degree of the increase, it is understood that there are two groups: the magnetic heads in which the distance $L_P$ is 20 μm or less; and the magnetic heads in which the distance $L_P$ is 22 μm or more. In the former head group, the degree of the increase becomes rapid particularly when the hour of time exceeds 100 hours, however in the latter head group, the degree of the increase becomes slower. Therefore, it is understood that the wear resistance becomes improved critically when the distance $L_P$ exceeds 20 μm. Practically, in order to obtain a secure and favorable wear resistance, the distance $L_P$ (μm) is required to satisfy the following expression:

$$L_P \geq 22 \quad (1)$$

Figure 12:
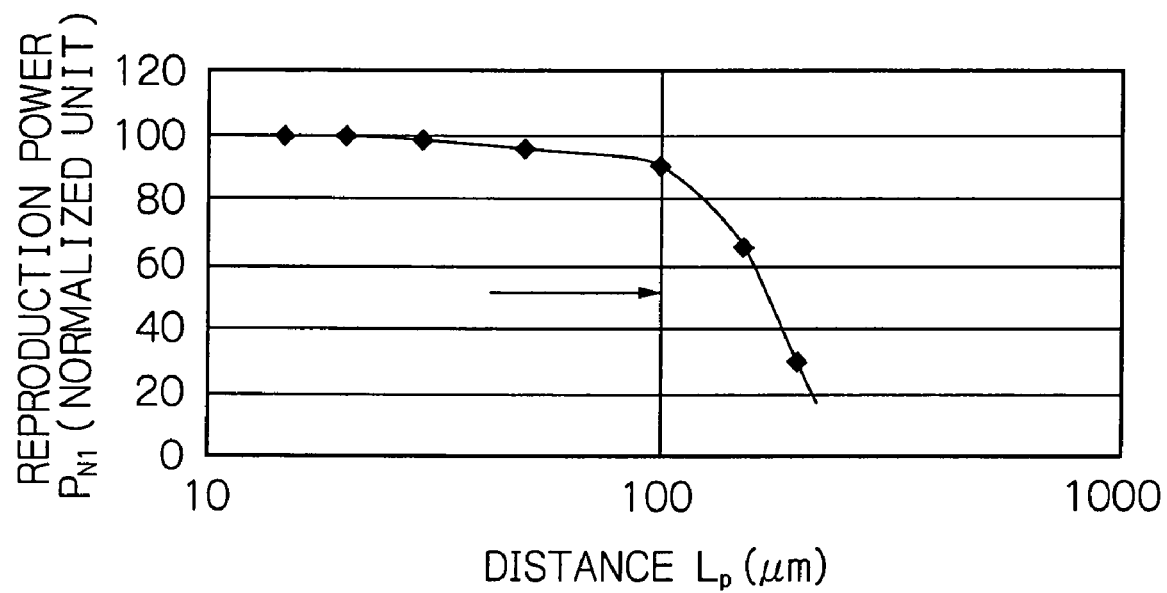
FIG. 12 shows a graph illustrating the relation between the distance $L_P$ and the reproduction power $P_{N1}$.

FIG. 12 shows a graph illustrating the relation between the distance $L_P$ and the reproduction power $P_{N1}$. The value of the reproduction power $P_{N1}$ is normalized by setting a reproduction power at the distance $L_P=10$ μm to 100. The reproduction power $P_{N1}$ of the thin-film magnetic head pressed to the disk was measured using the same measurement system as that for the wear measurement shown in FIG. 11b.

As shown in FIG. 12, the reproduction power $P_{N1}$ remains approximately a normalized value 90 when the distance $L_P$ is 100 μm, though gradually decreases till the distance $L_P$ reaches 100 μm. When the distance $L_P$ exceeds 100 μm, the reproduction power $P_{N1}$ decreases steeply. It is considered to be a reason of the result that, in the case where the trailing contact end of the element contact pad is rather separated from the one end of the magnetic head element, the area of the flexible disk opposed to the one end of the magnetic head element is bent, then the bending is likely to cause the distance between the one end of the magnetic head element and the disk surface to be fluctuated. Therefore, in order to maintain a predetermined reproduction power, the distance $L_P$ (μm) is required to satisfy the following expression:

$$L_P \leq 100 \quad (2)$$

From the above-described expressions (1) and (2), it is understood that the condition expression to be satisfied by distance $L_P$ is:

$$22 \leq L_P \leq 100 \quad (3)$$

Next, the preferable conditions to be satisfied by the positional relation between the element contact pads or between the element contact pad and the dummy head, from the standpoint of the reproduction power, will be explained in detail.

Figure 13A:
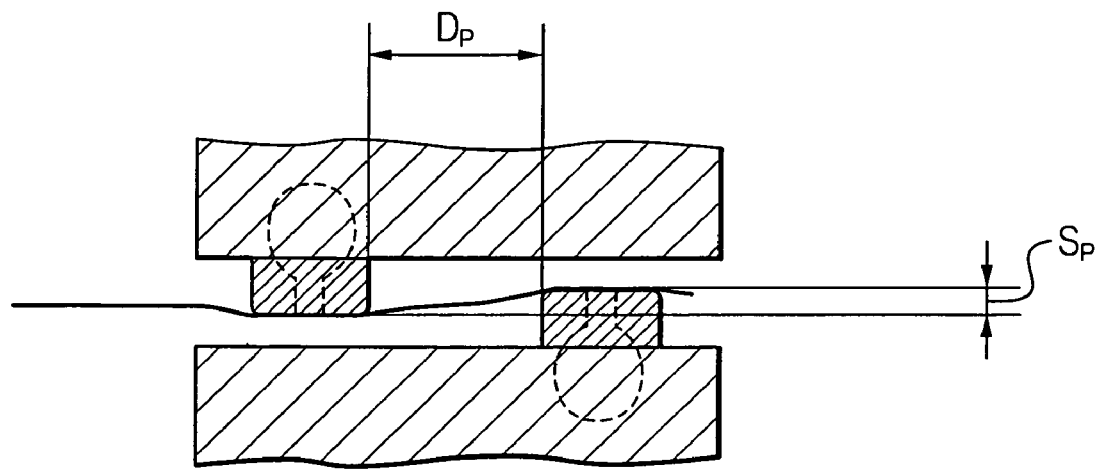
FIG. 13a shows a schematic view for defining a spacing $D_P$ and a distance $S_P$ that represent the positional relation in the embodiment shown in FIG. 6a, and FIG. 13b shows a graph illustrating the relation between the positional relation and the reproduction power $P_{N2}$.
Figure 13B:
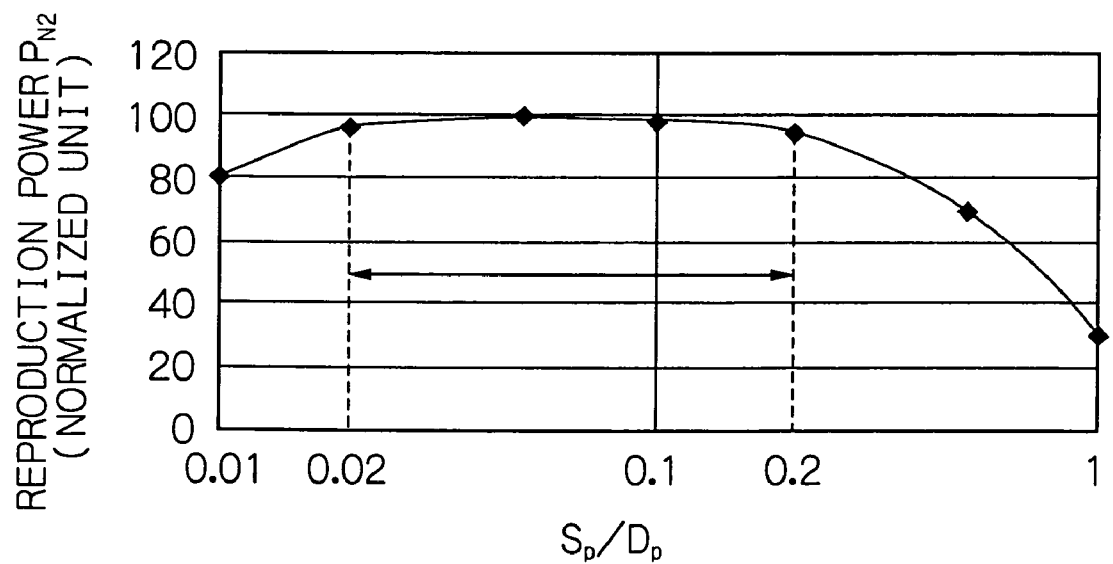

FIG. 13a shows a schematic view for defining a spacing $D_P$ and a distance $S_P$ that represent the positional relation between the element contact pads in the embodiment shown in FIG. 6a, and FIG. 13b shows a graph illustrating the relation between the positional relation and the reproduction power $P_{N2}$. In order to measure the reproduction power $P_{N2}$ in the embodiment shown in FIG. 6a, a flexible disk rotating with usual speed where signals are written on each of both surfaces, was pinched by the two thin-film magnetic heads shown in FIG. 5 with the same pressure as that during read and write operations. Then, a reproduction power was measured in one of the two thin-film magnetic heads. In the case that the pico sliders were used as the two heads, the $D_P$ value was in the range from 520 μm to 670 μm, and in the case using the femto sliders, the $D_P$ value was in the range from 150 μm to 350 μm. The properties of the used flexible disk were the same as that used for the wear measurement shown in FIG. 11b.

According to FIG. 13a, the $D_P$ is defined as a spacing in the track width direction between the two element contact pads, and the $S_P$ is defined as a distance between the respective contact surfaces of the two element contact pads. In FIG. 13b, the horizontal axis is a ratio $S_P/D_P$, that is to say, the larger the value is, the more increased the amount of forced bending of the flexible disk is. The value of the reproduction power $P_{N2}$ indicated in the vertical axis is normalized by setting a reproduction power at the ratio $S_P/D_P=0.5$ to 100.

As shown in FIG. 13b, when the ratio $S_P/D_P$ is in the range from 0.02 to 0.2, the reproduction power $P_{N2}$ stably remains in the range from 95 to 100, and is almost constant. However, when the ratio $S_P/D_P$ is less than 0.02, the reproduction power $P_{N2}$ is significantly decreased. The decrease may be considered to be caused by the destabilization of the contact condition between the element contact pads and the surface of the flexible disk due to decrease in the disk-pinching force of the element contact pads. Meanwhile, when the ratio $S_P/D_P$ is larger than 0.2, the reproduction power $P_{N2}$ is also significantly decreased. The decrease may be considered to be caused by the destabilization of the contact condition between the element contact pads and the surface of the flexible disk due to increase in the amount of forced bending of the flexible disk. Therefore, it is understood that the condition expression for maintaining a predetermined reproduction power stably, to be satisfied by the ratio $S_P/D_P$ is:

$$0.02 \leq S_P/D_P \leq 0.2 \quad (4)$$

Figure 14A:
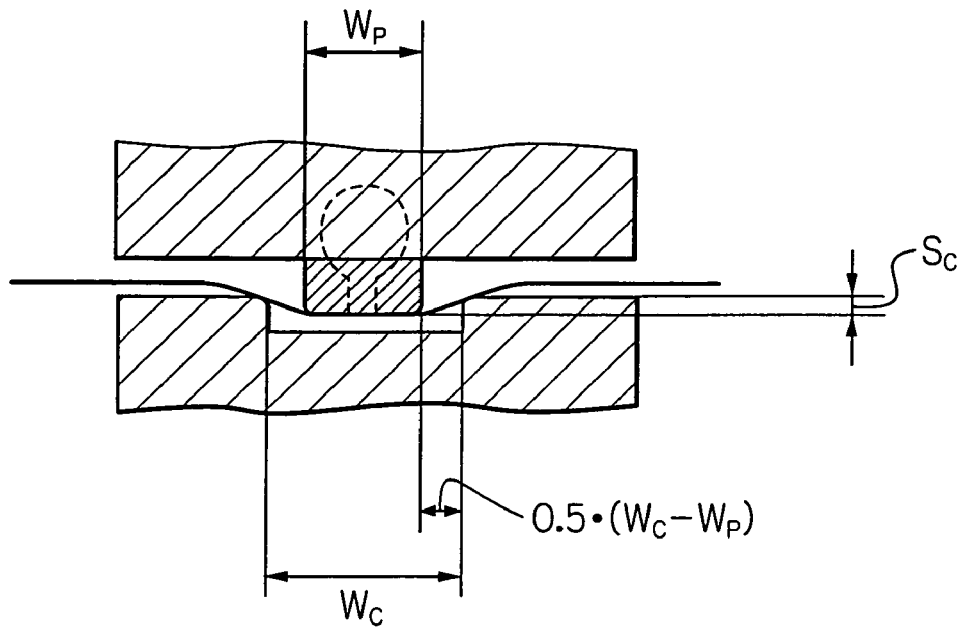
FIG. 14a shows a schematic view for defining a width $W_P$, a width $W_C$ and a distance $S_C$ that represents the positional relation in the embodiment shown in FIG. 6b.
Figure 14B:
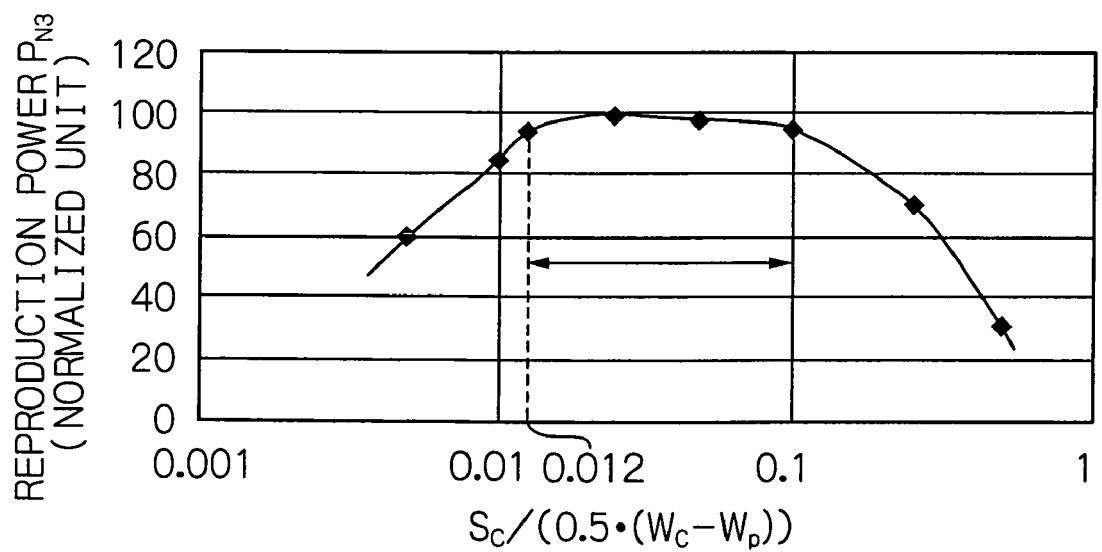
FIG. 14b shows a graph illustrating the reproduction power $P_{N3}$ versus the width and the positional relation.

FIG. 14a shows a schematic view for defining a width $W_P$ of the element contact pad, a width $W_C$ of the concave portion, and a distance $S_C$ that represents the positional relation between the element contact pad and the concave portion in the embodiment shown in FIG. 6b, and FIG. 14b shows a graph illustrating the reproduction power $P_{N3}$ versus the width and the positional relation. In order to measure the reproduction power $P_{N3}$ in the embodiment shown in FIG. 6b, a flexible disk rotating with usual speed where signals are written on each of both surfaces, was pinched by the thin-film magnetic head shown in FIG. 3 and the dummy head with the same pressure as that during read and write operations. Then, a reproduction power was measured in the thin-film magnetic head. In both cases that the pico sliders/the femto sliders were used in the head, the $W_C$ value was in the range from 200 μm to 600 μm. And the $W_P$ value in the both cases was in the range from 150 μm to 350 μm. The properties of the used flexible disk were the same as that used for the wear measurement shown in FIG. 11b.

According to FIG. 14a, the $W_P$ and $W_C$, which are parameters for the element contact pad and the dummy head, were defined as widths in the track width direction of the element contact pad and the concave portion respectively, and the $S_C$ is defined as a distance between the contact surface of the element contact pad and the sliding-side surface of the dummy head. In FIG. 14b, the horizontal axis is a ratio $S_C/(0.5*(W_C-W_P))$. The $0.5*(W_C-W_P)$ of the denominator is equivalent to a spacing between the side surface of the element contact pad and the wall surface of the concave portion when a part of the element contact pad is inserted in the concave portion. Therefore, the larger the ratio $S_C/(0.5*(W_C-W_P))$ is, the more increased the amount of forced bending of the flexible disk is. The value of the reproduction power $P_{N3}$ indicated in the vertical axis is normalized by setting a reproduction power at the ratio $S_C/(0.5*(W_C-W_P))$=0.025 to 100.

As shown in FIG. 14b, when the ratio $S_C/(0.5*(W_C-W_P))$ is in the range from 0.012 to 0.1, the reproduction power $P_{N3}$ stably remains in the range from 95 to 100, and is almost constant. However, when the ratio $S_C/(0.5*(W_C-W_P))$ is less than 0.012, the reproduction power $P_{N3}$ is significantly decreased. The decrease may be considered to be caused by the destabilization of the contact condition between the element contact pad and the surface of the flexible disk due to decrease in the disk-pinching force of the element contact pad and the dummy head. Meanwhile, when the ratio $S_C/(0.5*(W_C-W_P))$ is larger than 0.1, the reproduction power $P_{N3}$ is also significantly decreased. The decrease may be considered to be caused by the destabilization of the contact condition between the element contact pad and the surface of the flexible disk due to increase in the amount of forced bending of the flexible disk. Therefore, it is understood that the condition expression for maintaining a required reproduction power stably, to be satisfied by the ratio $S_C/(0.5*(W_C-W_P))$ is:

$$0.012 \leq S_C/(0.5*(W_C-W_P)) \leq 0.1 \qquad (5)$$

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
 a substrate having an element-formed surface and an opposed-to-medium surface;
 at least one magnetic head element provided in said element-formed surface, for writing and/or reading data signals;
 an overcoat layer formed on said element-formed surface so as to cover said at least one magnetic head element;
 a closure provided on said overcoat layer, a leading surface of said closure being in contact with a trailing surface of said overcoat layer; and
 at least one element contact pad protruded in a sliding-side surface of said thin-film magnetic head and comprising a contact surface including (a) part of said opposed-to-medium surface of said substrate, (b) a part of an end surface of said overcoat layer and (c) a part of an end surface of said closure, said contact surface having a contact with a surface of a flexible magnetic recording medium during reading and writing operations,
 a trailing end of said at least one element contact pad being positioned on a leading side in relation to a trailing surface of said closure, and
 one end of said at least one magnetic head element reaching said contact surface.

2. The thin-film magnetic head as claimed in claim 1, wherein a distance $L_P$ from said one end of the magnetic head element to a trailing end of a contact region of said contact surface satisfies a conditional expression of $22 \leq L_P \leq 100$, a unit of said $L_P$ being micrometer.

3. The thin-film magnetic head as claimed in claim 2, wherein said distance $L_P$ is a distance between a trailing end of said contact surface and said one end of the magnetic head element, in a case that the element contact pad and the magnetic recording medium are in contact with a part of said contact surface, the contact surface part ranging on a trailing side in relation to said one end of the magnetic head element.

4. The thin-film magnetic head as claimed in claim 1, wherein at least one of said at least one element contact pad is provided on a central axis of said sliding-side surface expanding in a direction along a track.

5. The thin-film magnetic head as claimed in claim 1, wherein at least one of said at least one element contact pad is provided in a position that is offset from a central axis of said sliding-side surface expanding in a direction along a track and is not overlapped with said central axis.

6. The thin-film magnetic head as claimed in claim 1, wherein at least one contact pad is provided in said opposed-to-medium surface of said substrate.

7. The thin-film magnetic head as claimed in claim 6, wherein the one element contact pad and the two contact pads are provided in said sliding-side surface of said thin-film magnetic head.

8. The thin-film magnetic head as claimed in claim 1, wherein said closure has a flat or curved cut-surface bordering a sliding-side end surface of said closure at its trailing edge.

9. The thin-film magnetic head as claimed in claim 1, wherein said closure has at least one flat or curved cut-surface cutting obliquely across a trailing edge of a sliding-side end surface of said closure.

10. The thin-film magnetic head as claimed in claim 1, wherein said at least one magnetic head element comprises a electromagnetic coil element for writing data signals and a magnetoresistive effect element for reading data signals.

11. The thin-film magnetic head as claimed in claim 10, wherein said magnetoresistive effect element is a tunnel magnetoresistive effect element.

12. The thin-film magnetic head as claimed in claim 1, wherein at least one signal electrode used for said at least one magnetic head element is provided on an exposed part of the upper surface of said overcoat layer.

13. A head gimbal assembly comprising:
 a thin-film magnetic head comprising:
 a substrate having an element-formed surface and an opposed-to-medium surface;
 at least one magnetic head element provided in said element-formed surface, for writing and/or reading data signals;
 an overcoat layer formed on said element-formed surface so as to cover said at least one magnetic head element;
 a closure provided on said overcoat layer, a leading surface of said closure being in contact with a trailing surface of said overcoat layer; and
 at least one element contact pad protruded in a sliding-side surface of said thin-film magnetic head and comprising a contact surface including (a) part of said opposed-to-medium surface of said substrate, (b) a part of an end surface of said overcoat layer and (c) a part of an end surface of said closure, said contact surface having a contact with a surface of a flexible magnetic recording medium during reading and writing operations,
 a trailing end of said at least one element contact pad being positioned on a leading side in relation to a trailing surface of said closure,
 one end of said at least one magnetic head element reaching said contact surface, and
 said head gimbal assembly further comprising:
 trace conductors for supplying currents to said at least one magnetic head element; and
 a support structure for supporting said thin-film magnetic head.

14. The head gimbal assembly as claimed in claim 13, wherein a distance $L_P$ from said one end of the magnetic head element to a trailing end of a contact region of said contact surface satisfies a conditional expression of $22 \leq L_P \leq 100$, a unit of said $L_P$ being micrometer.

15. The head gimbal assembly as claimed in claim 14, wherein said distance $L_P$ is a distance between a trailing end of said contact surface and said one end of the magnetic head element, in a case that the element contact pad and the magnetic recording medium are in contact with a part of said contact surface, the contact surface part ranging on a trailing side in relation to said one end of the magnetic head element.

16. The head gimbal assembly as claimed in claim 13, wherein at least one of said at least one element contact pad is provided on a central axis of said sliding-side surface expanding in a direction along a track.

17. The head gimbal assembly as claimed in claim 13, wherein at least one of said at least one element contact pad is provided in a position that is offset from a central axis of said sliding-side surface expanding in a direction along a track and is not overlapped with said central axis.

18. The head gimbal assembly as claimed in claim 13, wherein at least one contact pad is provided in said opposed-to-medium surface of said substrate.

19. The head gimbal assembly as claimed in claim 18, wherein the one element contact pad and the two contact pads are provided in said sliding-side surface of said thin-film magnetic head.

20. The head gimbal assembly as claimed in claim 13, wherein said closure has a flat or curved cut-surface bordering a sliding-side end surface of said closure at its trailing edge.

21. The head gimbal assembly as claimed in claim 13, wherein said closure has at least one flat or curved cut-surface cutting obliquely across a trailing edge of a sliding-side end surface of said closure.

22. The head gimbal assembly as claimed in claim 13, wherein said at least one magnetic head element comprises a electromagnetic coil element for writing data signals and a magnetoresistive effect element for reading data signals.

23. The head gimbal assembly as claimed in claim 22, wherein said magnetoresistive effect element is a tunnel magnetoresistive effect element.

24. The head gimbal assembly as claimed in claim 13, wherein at least one signal electrode used for said at least one magnetic head element is provided on an exposed part of the upper surface of said overcoat layer.

25. A magnetic recording apparatus comprising:
at least one head gimbal assembly comprising:
a thin-film magnetic head comprising:
a substrate having an element-formed surface and an opposed-to-medium surface;
at least one magnetic head element provided in said element-formed surface, for writing and/or reading data signals;
an overcoat layer formed on said element-formed surface so as to cover said at least one magnetic head element;
a closure provided on said overcoat layer, a leading surface of said closure being in contact with a trailing surface of said overcoat layer; and
at least one element contact pad protruded in a sliding-side surface of said thin-film magnetic head and comprising a contact surface including (a) a part of said opposed-to-medium surface of said substrate, (b) a part of an end surface of said overcoat layer and (c) a part of an end surface of said closure, said contact surface having a contact with a surface of a flexible magnetic recording medium during reading and writing operations,
a trailing end of said at least one element contact pad being positioned on a leading side in relation to a trailing surface of said closure, and
one end of said at least one magnetic head element reaching said contact surface,
said at least one head gimbal assembly further comprising:
trace conductors for supplying currents to said at least one magnetic head element; and
a support structure for supporting said thin-film magnetic head, and said magnetic recording apparatus further comprising:
at least one magnetic recording medium; and
a recording and/or reproducing circuit for controlling write and/or read operations of the at least one thin-film magnetic head in relation with said at least one magnetic recording medium.

26. The magnetic recording apparatus as claimed in claim 25, wherein a distance $L_P$ from said one end of the magnetic head element to a trailing end of a contact region of said contact surface satisfies a conditional expression of $22 \leq L_P \leq 100$, a unit of said $L_P$ being micrometer.

27. The magnetic recording apparatus as claimed in claim 26, wherein said distance $L_P$ is a distance between a trailing end of said contact surface and said one end of the magnetic head element, in a case that the element contact pad and the magnetic recording medium are in contact with a part of said contact surface, the contact surface part ranging on a trailing side in relation to said one end of the magnetic head element.

28. The magnetic recording apparatus as claimed in claim 25, wherein at least one of said at least one element contact pad is provided on a central axis of said sliding-side surface expanding in a direction along a track.

29. The magnetic recording apparatus as claimed in claim 25, wherein at least one of said at least one element contact pad is provided in a position that is offset from a central axis of said sliding-side surface expanding in a direction along a track and is not overlapped with said central axis.

30. The magnetic recording apparatus as claimed in claim 25, at least one contact pad is provided in said opposed-to-medium surface of said substrate.

31. The magnetic recording apparatus as claimed in claim 30, wherein the one element contact pad and the two contact pads are provided in said sliding-side surface of said thin-film magnetic head.

32. The magnetic recording apparatus as claimed in claim 25, wherein said closure has a flat or curved cut-surface bordering a sliding-side end surface of said closure at its trailing edge.

33. The magnetic recording apparatus as claimed in claim 25, wherein said closure has at least one flat or curved cut-surface cutting obliquely across a trailing edge of a sliding-side end surface of said closure.

34. The magnetic recording apparatus as claimed in claim 25, wherein said at least one magnetic head element comprises a electromagnetic coil element for writing data signals and a magnetoresistive effect element for reading data signals.

35. The magnetic recording apparatus as claimed in claim 34, wherein said magnetoresistive effect element is a tunnel magnetoresistive effect element.

36. The magnetic recording apparatus as claimed in claim 25, wherein at least one signal electrode used for said at least one magnetic head element is provided on an exposed part of the upper surface of said overcoat layer.

37. The magnetic recording apparatus as claimed in claim 25, wherein the respective sliding-side surfaces of the two thin-film magnetic heads pinch the magnetic recording medium and the respective element contact pads of the two thin-film magnetic heads are positioned not to be opposed to each other.

38. The magnetic recording apparatus as claimed in claim 37, wherein each of said two thin-film magnetic heads has the one element contact pad, and said one element contact pad is provided in a position to be offset from respective central axes expanding in a direction along a track of the sliding-side surfaces of said two thin-film magnetic heads, in opposite direction to each other, and said one element contact pad is not overlapped with the central axis.

39. The magnetic recording apparatus as claimed in claim 38, wherein a spacing $D_P$ in track width direction between the respective two element contact pads of said two thin-film magnetic heads and a distance $S_P$ between the respective contact surfaces of the two element contact pads satisfy a condition expression of $0.02 \leq S_P/D_P \leq 0.2$.

40. The magnetic recording apparatus as claimed in claim 25, wherein, respective sliding-side surfaces of said thin-film magnetic head and a dummy head pinch the magnetic recording medium, and said dummy head has at least one concave portion provided in a position that is in the sliding-side surface and is opposed to said at least one element contact pad, said at least one concave portion being so large in size that at least a part of the element contact pad can be inserted.

41. The magnetic recording apparatus as claimed in claim 40, wherein said thin-film magnetic head has the one element contact pad, and said one element contact pad is provided on a central axis of the sliding-side surface of said thin-film magnetic head expanding in the direction along a track.

42. The magnetic recording apparatus as claimed in claim 41, wherein a width $W_P$ in track width direction of said one element contact pad, a width $W_C$ in the track width direction of the concave portion, and a distance $S_C$ between said contact surface of said one element contact pad and a sliding-side surface of the dummy head satisfy a condition expression of $0.012 \leq S_C/(0.5*(W_C-W_P)) \leq 0.1$.

* * * * *